(12) United States Patent
Luzzi et al.

(10) Patent No.: US 6,175,832 B1
(45) Date of Patent: *Jan. 16, 2001

(54) METHOD, SYSTEM AND PROGRAM PRODUCT FOR ESTABLISHING A DATA REPORTING AND DISPLAY COMMUNICATION OVER A NETWORK

(75) Inventors: Joseph Luzzi, Ridgefield; Gengxin Zhu, Southbury, both of CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/075,621

(22) Filed: May 11, 1998

(51) Int. Cl.[7] .................................................. G06F 15/173
(52) U.S. Cl. ............................... 707/10; 707/3; 707/102; 709/203; 709/219; 709/223
(58) Field of Search ........................ 707/10, 9, 102, 707/3; 395/200.33, 200.49, 200.53, 200.8; 709/203, 219, 223

(56) References Cited

U.S. PATENT DOCUMENTS

| | | | |
|---|---|---|---|
| 4,858,152 | 8/1989 | Estes et al. | 364/550 |
| 5,367,670 | 11/1994 | Ward et al. | 395/575 |
| 5,446,680 | 8/1995 | Sekiya et al. | 364/550 |
| 5,483,468 | 1/1996 | Chen et al. | 364/551.01 |
| 5,559,958 | 9/1996 | Farrand et al. | 395/183.03 |
| 5,566,339 | 10/1996 | Perholtz et al. | 395/750 |
| 5,621,663 | 4/1997 | Skagerling | 364/550 |
| 5,655,081 | 8/1997 | Bonnell et al. | 395/200.32 |
| 5,675,798 | 10/1997 | Chang | 395/680 |
| 5,694,595 | * 12/1997 | Jacobs et al. | 707/9 |
| 5,715,453 | 2/1998 | Stewart | 395/615 |
| 5,732,219 | * 3/1998 | Blumer et al. | 709/227 |
| 5,742,762 | * 4/1998 | Scholl et al. | 709/200 |
| 5,859,972 | * 1/1999 | Subramaniam et al. | 395/200.33 |
| 5,873,086 | * 2/1999 | Fujii et al. | 707/10 |
| 5,930,768 | * 7/1999 | Hooban | 705/27 |
| 5,961,594 | * 10/1999 | Bouvier et al. | 709/223 |
| 5,999,972 | * 12/1999 | Gish | 709/219 |
| 6,012,100 | * 1/2000 | Frailong et al. | 709/250 |
| 6,031,836 | * 2/2000 | Haserodt | 370/389 |
| 6,067,552 | * 5/2000 | Yu | 707/501 |

* cited by examiner

Primary Examiner—Jean R. Homere
(74) Attorney, Agent, or Firm—Marc A. Ehrlich; Floyd A. Gonzalez

(57) ABSTRACT

A method system and program product for facilitating the transfer of data between a requesting computer and data repository over a computer network is disclosed herein. An interface is provided over the network to a requesting computer from a front-end server computer via a network communication session. Via the interface the requesting computer generates requests to the data repository to access the data stored therein. Requests are passed via a temporary data link from the requesting computer to a software-based bridge element which is continuously logically coupled to the data repository. The bridge accesses the requested data from the repository and sends the requested data to the requesting computer system. The communication session between the front-end server and the requesting computer may be terminated upon the sending of the interface to permit the server to service further requests.

39 Claims, 18 Drawing Sheets

IBM                                                                AMA 2.0

<== BACK TO MAIN MENU

AMA RESPONSE AND AVAILABILITY

TARGET SITE: *POUGHKEEPSIE*   SERVER TYPE: *LOTUS NOTES (AIX) MAIL*

| FEB 1998 | AVAIL | 5%ILE | 50%ILE | 95%ILE |
|---|---|---|---|---|
| DAY | | | | |
| 1 | 83.7% | 0.055 | 0.070 | 0.094 |
| 2 | 98.2% | 0.071 | 0.110 | 14.062 |
| 3 | 99.9% | 0.079 | 0.118 | 0.680 |
| 4 | 99.4% | 0.071 | 0.125 | 1.227 |
| 5 | 99.6% | 0.078 | 0.140 | 0.836 |
| 6 | 99.0% | 0.078 | 0.148 | 3.133 |
| 7 | 100.0% | 0.070 | 0.109 | 0.242 |
| 8 | 99.8% | 0.055 | 0.086 | 0.117 |
| 9 | 96.1% | 0.078 | 0.172 | 1.515 |
| 10 | 94.8% | 0.070 | 0.125 | 0.954 |
| 11 | 98.9% | 0.071 | 0.125 | 0.906 |
| 12 | 99.3% | 0.078 | 0.125 | 0.492 |
| 13 | 99.6% | 0.063 | 0.109 | 0.399 |
| 14 | 98.2% | 0.063 | 0.094 | 0.157 |
| 15 | 98.8% | 0.062 | 0.102 | 0.235 |
| 16 | 99.8% | 0.070 | 0.102 | 0.328 |
| 17 | 99.3% | 0.070 | 0.117 | 1.179 |
| 18 | 98.5% | 0.070 | 0.117 | 0.742 |
| 19 | 98.7% | 0.078 | 0.148 | 0.843 |
| 20 | 99.6% | 0.070 | 0.117 | 0.531 |
| 21 | 92.4% | 0.071 | 0.141 | 0.274 |
| 22 | 99.2% | 0.062 | 0.078 | 0.133 |
| 23 | 96.5% | 0.070 | 0.102 | 1.093 |
| 24 | 97.1% | 0.070 | 0.117 | 0.750 |
| 25 | 98.8% | 0.071 | 0.117 | 0.804 |
| 26 | 98.9% | 0.070 | 0.117 | 0.774 |
| 27 | 99.2% | 0.070 | 0.117 | 0.492 |
| 28 | 98.1% | 0.070 | 0.102 | 0.164 |

OPTIONS

◉ AMA RESPONSE AND AVAILABILITY  ○ SERVER [D01ML001 ▽]
○ IP PING TIME AND AVAILABILITY  ◉ ALL LISTED SERVERS

MONTH [FEB ▽]   YEAR [1998 ▽]

FIG.8

METHOD, SYSTEM AND PROGRAM PRODUCT FOR ESTABLISHING A DATA REPORTING AND DISPLAY COMMUNICATION OVER A NETWORK

CROSS REFERENCE TO RELATED APPLICATIONS

The present invention is related and cross-reference may be had to the following co-pending U.S. patent applications: Client-Based Application Availability and Response Monitoring and Reporting for Distributed Computing Environments, by Luzzi et al. Ser. No. 09/075,629, now U.S. Pat. No. 6,070,190, and Interactive Display System for Sequential Retrieval and Display of a Plurality of Interrelated Data Sets, by Luzzi et al. Ser. No. 09/075,704. Each of these cases is assigned to the present assignee and is filed concurrently herewith and is incorporated herein by reference.

FIELD OF THE INVENTION

The present invention is generally related to the field of computer network performance enhancement, and particularly to a method, system and program product for providing a network interface to a data repository. More specifically, the present invention enables the fulfillment of remote requests for data from a central repository and the provision of a locally executing interactive graphical display for the requested data at a requesting networked computer system.

BACKGROUND OF THE INVENTION

The Internet is a decentralized network of computers that can communicate with one another via a transmission control protocol/internet protocol (TCP/IP). Although the Internet has its origins in a network created by Advanced Research Project Agency (ARPA) in the 1960's, it has only recently become a worldwide communication medium. To a large extent, the explosive growth in use of the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC),a variety of information retrieval services such as FTP (file transfer protocol) and Gopher. The WWW is a client-server based facility that includes a number of servers (computers connected to the Internet) on which Web pages or files reside, as well as clients (Web browsers) which interface the users with the Web pages. Specifically, Web browsers and software applications such as Communicator (trademark of Netscape Communication Corporation) send a request over the WWW to a server requesting a web page identified by a Uniform Resource Locator (URL) which notes both the server where the Web page resides and the file or files on the server which makes up the Web page. The server then sends a copy of the requested file(s) to the Web browser, which in turn displays the Web page to the user.

The Web pages on the WWW may be hyper-media documents written in a standardized language called Hyper-Text Markup Language (HTML). A typical Web page includes text together with embedded formatting commands, referred to as tags, which can be used to control font size, font style and the like. A Web browser parses the HTML script in order to display the text in accordance with the specified format.

The widely distributed nature of the Internet as well as other currently popular distributed computing environments such as intranets (scaled versions of the Internet providing communications bounded by a firewall typically within a business entity) has enabled the provision of information or content to an ever broadening user-base. Concomitantly, the need has developed for managing this extensive user connectivity. In particular, it has been increasingly difficult for content providers to provide servers having the connectivity capacity required to fulfill concurrent requests from numerous client computers in a reasonable time period. Additionally, graphical content, while extremely powerful in its ability to convey information to a client, typically comprises large amounts of data and the communication of this data presents challenges with respect to processor resource at the server.

Often the information sought by clients in a distributed computing environment resides in restricted or secured databases which may require special access codes or special seat licenses for access to the data therein. Content providers have been challenged to provide controlled and authenticated access to these secure repositories in such a manner as to be transparent to the client computer while still ensuring the security of the data therein.

Connectivity management in a distributed computing environment is often more important than the quality of the information provided by the server owner. Many servers owners have lost clients based upon their failure to address such issues.

Historically such connectivity and processor resource issues have been addressed by augmenting the base hardware at the server owner's location. Server owners are continually upgrading their computer systems to ensure that clients are provided with timely access to meaningful content. Of course this solution does not ensure complete content access and requires perpetual and expanding expenditures on the part of the server owner. Moreover, this solution fails to address problems created by the need to occasionally provide event-based server sites which are in heavy client demand such as the web-based tracking of the Olympic games or the recent Mars exploration expedition by NASA. Security authentication management has been treated in a number of different ways including, the use encryption techniques which may require additional software for the client and the use of secure passwords for access to particular pieces of information, however the maintenance of these secure systems and passwords has varied widely. For example, in some "secure" Web-sites the user's password which gives a client the ability to access private data is stored in a local file on a client's computer (also referred to as a "cookie"). This file may be copied from the clients computer thereby enabling third parties to access the secure information.

SUMMARY OF THE INVENTION

The foregoing problems and shortcomings of the prior art are overcome and further advantageous features are provided by the present invention wherein is taught a method, apparatus and program product for facilitating the transfer of data between a requesting computer and data repository over a computer network.

In accordance with the present invention an interface is provided over the network to a requesting computer from a front-end server computer via a network communication session. The interface, which in a preferred embodiment is provided to the requesting computer in the form of a self-executing packet of Java code, is interpreted via a web browser application at the requesting computer to provide interface applets for generating requests from the requesting computer to the data repository to access the data stored therein.

Requests are passed via a temporary data link established between the requesting computer and a software-based bridge element which is continuously logically coupled to the data repository via a second network communication session. The temporary data link is established upon the issuance of the requests from the requesting computer. The bridge responds to these requests by accessing the requested data from the repository and sending the requested data to the requesting computer system.

In an embodiment of the invention the interface applets include a graphical user interface including tabular and graphical representations. Through the graphical user interface a user of the requesting computer system generates the requests for the stored data and through the interface the retrieved data is displayed to the user.

In a further embodiment of the invention the communication session established between the front-end server and the requesting computer system performs an authentication operation prior to sending the interface to the requesting computer system. In yet a further embodiment, receipt of the interface authorizes the requesting computer system to access the stored data through the bridge element.

In accordance with another aspect of the invention, the network communication session established between the front-end server system and the requesting computer is terminated upon the provision of the interface to the requesting computer, thereby freeing the front-end server system to serve other requesting computers.

In accordance with yet a further feature of the present invention multiple requesting computers each provided with an interface from the front-end server may request data from the repository. In such an embodiment, corresponding data links are established between the bridge element and each of the one or more requesting computers. The continuous second communication session between the bridge and the repository serially provides access for the requesting computer systems to the data stored in the repository.

BRIEF DESCRIPTION OF THE DRAWINGS

The subject matter which is regarded as the invention is particularly pointed out and distinctly claimed at the conclusion of the specification. The foregoing as well as other features and advantages of the invention will be apparent from the following detailed description in conjunction with the accompanying drawings, in which:

FIG. 8 depicts the data illustrated in FIGS. 7 and 7a in a tabular form which is dynamically linked thereto;

DETAILED DESCRIPTION OF THE PREFERRED EMBODIMENT OF THE INVENTION

The following description will present a preferred embodiment of the present invention wherein a system, method and program product for monitoring, reporting and providing alerts based upon the response time and session availability of a Lotus Notes (Notes is a trademark of Lotus Development Corporation) application program running on a server computer wherefrom the services of the application program are provided to a client computer system coupled via a distributed computing network to the server computer system is provided. Notwithstanding the specific nature of the ensuing description, it will be readily understood by those skilled in the art that such inventive monitoring and alerting techniques as described herein may be employed to assess any desired performance characteristics of any application running in a distributed computing environment from the vantage point of a network resource (i.e., a client of the server) requesting and receiving the services of the application provided from another remote resource (i.e., the server) within the distributed computing environment. For example, and without limitation, such an inventive system, method and program product as described herein may be readily incorporated into a corporate intranet or extranet to assess the availability and response times of hypertext markup language (HTML) based applications running on a server computer and accessed by a client computer via hypertext transfer protocol (HTTP) over an intranet or over the Internet.

Figure 1:
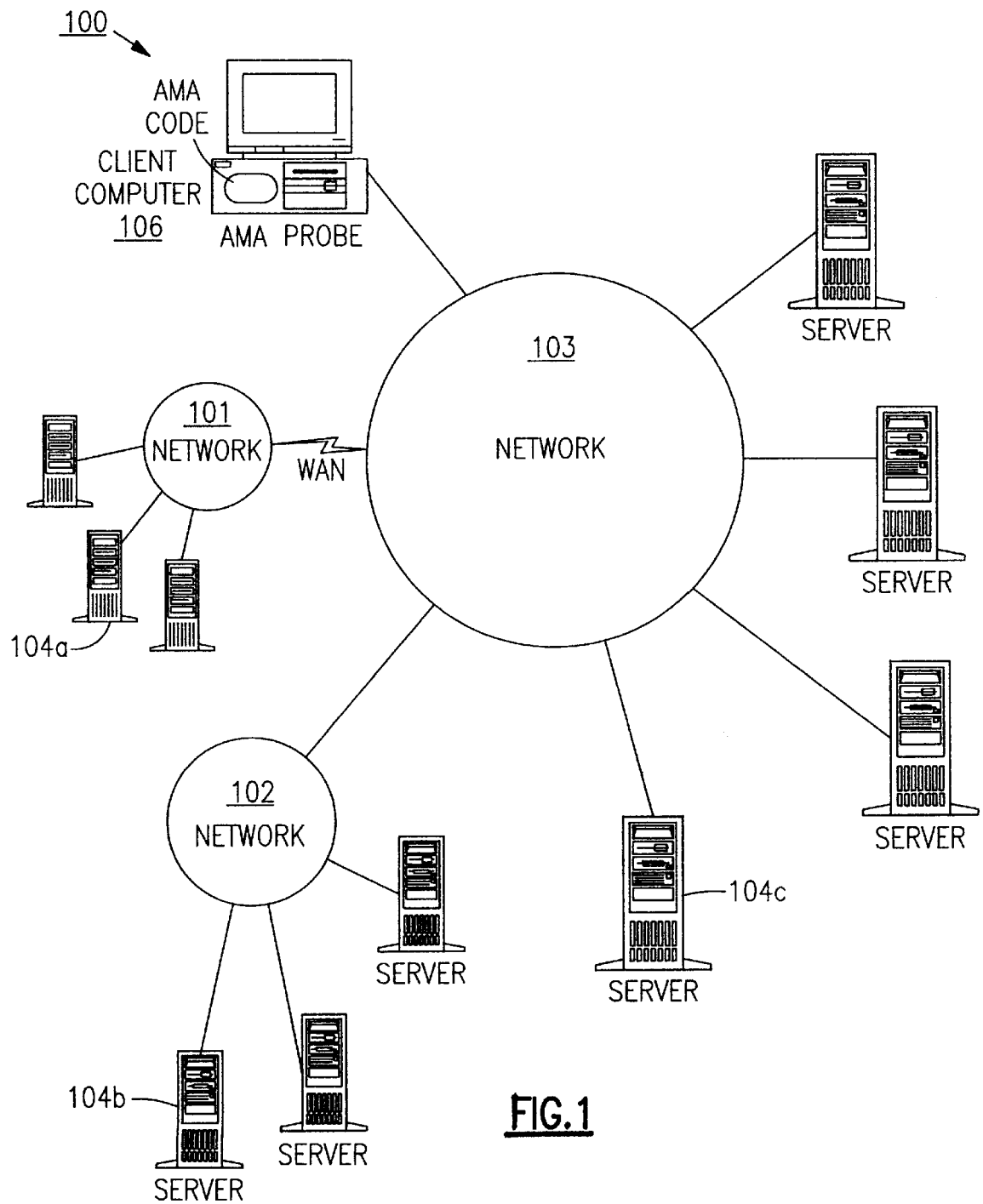
FIG. 1 illustrates a typical network computer environment in which the present invention may be implemented.

In order to better appreciate the advantageous features of the present invention, it will be instructive to first consider a typical distributed computing environment in which the present invention may be implemented. Accordingly, FIG. 1 depicts a typical distributed computing environment 100 which may be characteristic of the computing environment of a small to mid-sized enterprise, and which can be expanded upon to include broader networks such as a corporate network or intranet for a large business enterprise or the Internet. In such a distributed computing environment 100 it is likely that there will be one or more networks 101, 102 of varying size, each including a set of server computers 104a, 104b which may provide services and information to a set of client computers also coupled to the network 103 (one of the exemplary client computers may execute the monitoring code in accordance with the present invention). These smaller networks 101, 102, which may for example represent local area networks for a regional office of an enterprise, may in turn be coupled to one or more larger networks 103. The larger networks 103 would typically couple a set of such smaller networks 101, 102 as well as other server computers 104c, and correspondingly enable, for example, client or server computers on any of the smaller regional local networks 101, 102 to couple to server or client computers on the other small local network 102, 101 or on the larger network 103.

In the course of the ensuing discussion it will be understood that references to server computers correspond to a class of computers which are typically stand-alone computer systems which have been adapted (i.e., programmed) for one primary purpose, that of providing services to individual network users at client computers. Likewise, a client computer may be a stand-alone computer system or any other type of data processing system that has been adapted to interact with server computer systems over a network, including without limitation network computers (NCs). Client computer systems generally refer to any computer system adapted for the use of an individual rather than for use by other computer systems.

It will be further understood herein that the exemplary distributed computing structure or network 100 depicted in FIG. 1 is merely an illustration of a typical distributed computing environment in which the present invention may be advantageously implemented. A virtually unlimited number of variations of this same basic computing environment including the expansion of the distributed computing environment to the widely distributed computing environment of the Internet will provide a suitable platform for practicing the present invention.

Figure 2:
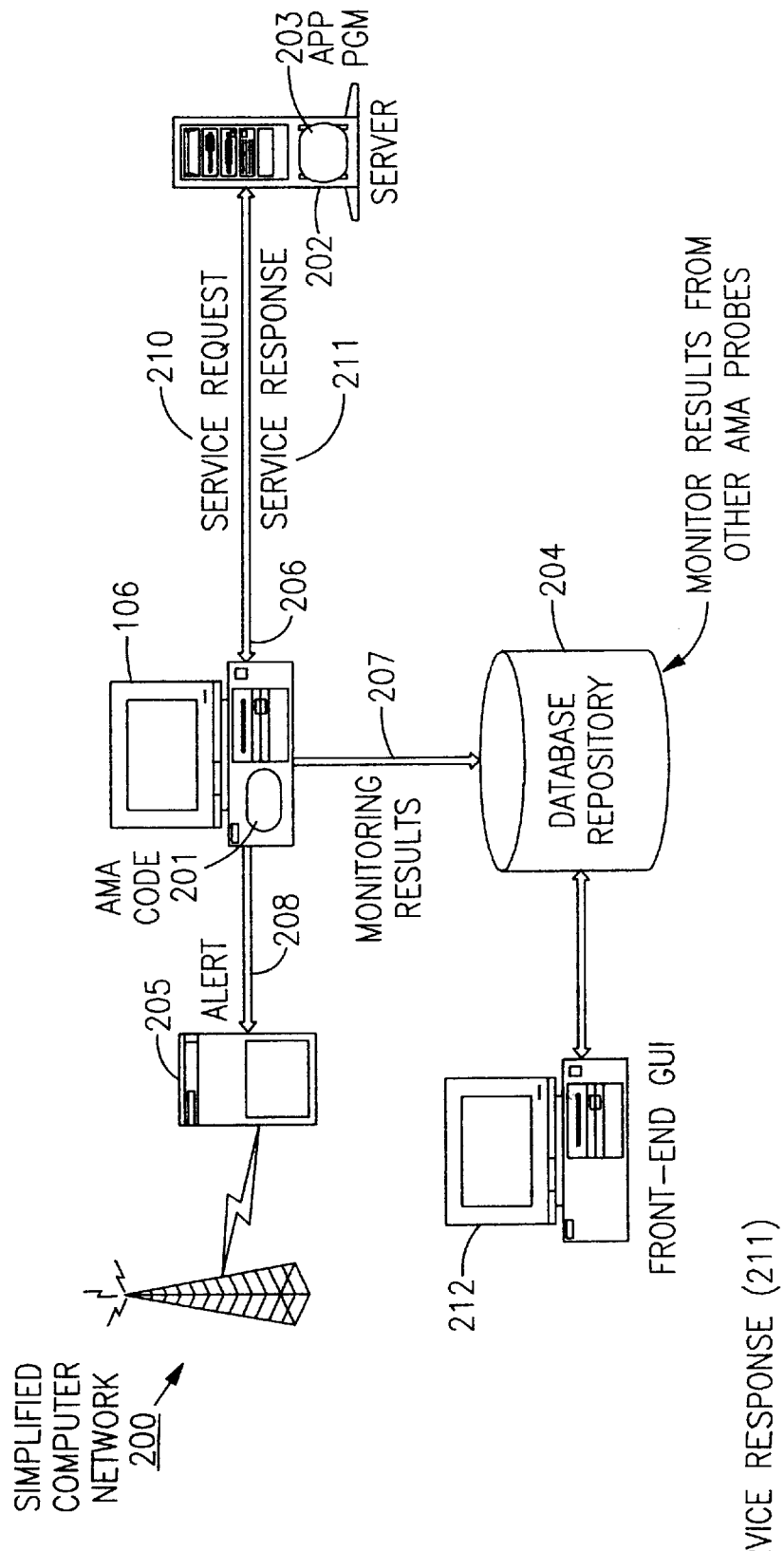
FIG. 2 depicts a simple, single probe implementation of the present invention for monitoring the performance of a Lotus Notes application program on a server computer at a client computer and for recording and storing monitored performance data for presentation via a graphical user interface front-end as well as signalling support personnel via alerts if a pre-determined performance threshold is violated.

Turning now to our invention in greater detail, reference may be had to FIG. 2 wherein is illustrated a simplified computer network 200 including an application monitoring and alerting (AMA) probe 201 designed in accordance with the principals of the present invention. From a cursory inspection of the network 200 it can be seen that the AMA probe 201 is embodied in a client computer (for example computer system 106 in FIG. 1) which is coupled to a server computer 202. The server computer 202 includes an application program 203, the performance of which will be assessed by the monitoring and alerting activities of the AMA probe 201.

In operation, the AMA probe 201 establishes a session with the server computer 202 by requesting the services of the application program 203 operating thereon. Session establishment is actuated by a service request 210 sent from the AMA probe 201 over a network link 206 to the server computer 202. Correspondingly, the server computer's application program 203 provides a service response 211 over a network link 206 back to the requesting AMA probe 201.

It is particularly noteworthy that the foregoing sequence of transactions is precisely the same sequence of transactions undertaken by a customer of the computer network 100 seeking the services of the application program 203 on the server computer 202 at his/her client computer 106. In essence, by monitoring an application program and providing alerts based upon the aforementioned sequence from the viewpoint of the AMA probe 201, the present invention achieves a realistic picture of the performance of the application program 203 from the vantage point of a customer using the application program over the distributed computing system 100 at client computer 106. By implementing the AMA probe 201 in this manner it is possible to gather real-time information based upon an "end-user's" experience of a client-server based application program 203. The AMA probe 201, in accordance with the preferred embodiment of the invention, quantifies the availability and the response time or other desired performance aspects of such an application program in relation to pre-defined and often contractually enforced performance criteria for the network 100. Consequently, based upon the results obtained from such a probe it is a relatively simple matter to establish such performance criteria for a given application program over a given network and correspondingly to identify instances wherein an application program on the network fails to meet the established criteria. Through the facilities of the present invention, a network manager may establish and monitor adherence to SLA objectives.

Turning to a more detailed consideration of FIG. 2, it is noted that the AMA probe 201 may receive a number of different types of service responses from the server computer 202. For example, if the application program 203 on the server computer 202 properly responds to the service request, the AMA probe 201 will receive an indication of a successfully completed request i.e., a successful service response, from the server computer 202. Alternatively, if the server computer 202 is unavailable to respond to the service request 210, the request will timeout after a predetermined period and the AMA probe 201, based upon receiving back no response for the time out period, will record that the server computer was not available. This can be viewed as an unsuccessful service response 211. Finally, if the server computer 202 rejects the service request 210 the AMA probe will again record the transaction as an unsuccessful service response 211. A rejected service request 210 may correspond to a variety of different situations, such as, wherein the client is not authorized to access the particular server or application program 203 thereon, or wherein the application program 203 has been temporarily taken "off-line" for maintenance purposes or if the application program 203 is functioning improperly for any number of reasons.

Whether it is successful or unsuccessful, the service response 211 from the application program 203 on the server computer 202 (including the determination of a no-response time-out) is received at the AMA probe 201, which then records the results of the transaction in a database repository 204.

The database repository 204 may be local to the AMA probe on the client computer 106 and/or remote from the probe at another point on the network 200 coupled thereto by a network link 207 or in a preferred embodiment, the invention may include both a local and remote data repository 204 and data may be stored locally and forwarded either concurrently or subsequently to a centralized remote repository which collects probe data from a number of probes monitoring different applications at different points on a distributed computing network 100. In the preferred embodiment, the centralized database repository 204 for recording the transaction records from multiple probes 201 on the network 100, is designed to be accessible to any user of the distributed computing network 100 and would ideally provide a front-end graphical user interface (GUI) 212 such as an intranet-based web site accessed via hypertext transfer protocol (HTTP) and providing a page or pages of hypertext code (i.e. hypertext markup language or HTML pages) which would permit anyone within the enterprise to easily access and analyze the data stored therein. Further details of such a centralized reporting mechanism including a graphics-based reporting interface will be subsequently described herein.

In a further preferred embodiment of the present invention, facilities are provided for accommodating the establishment of a set of performance criteria for the monitored application program 203. In such a preferred embodiment, the AMA probe 201 determines whether any pertinent elements of the completed transaction including the service request 210 from the probe and the corresponding service response 211 from the application program 203 on server computer 202 have exceeded such pre-defined criteria. The pre-defined performance criteria may include such metrics as maximum allowable response time, and/or a maximum number of failed successive attempts to access the services of the application program (i.e., an indicia of session availability).

A determination that one of these pre-defined performance criteria has been violated prompts the AMA probe 201 to generate an alert signal 208 which is sent to an alerting mechanism 205, which in turn is designed to inform an appropriate support entity of the violation such that problem determination and remediation steps may be quickly implemented.

To better illustrate the foregoing transaction sequence we will refer to a preferred embodiment of the present invention wherein a Lotus Notes application program 203 is included on the server computer 202. The client computer 106 including the AMA probe 201 further includes configuration facilities for implementing the function of the probe.

Figure 3:
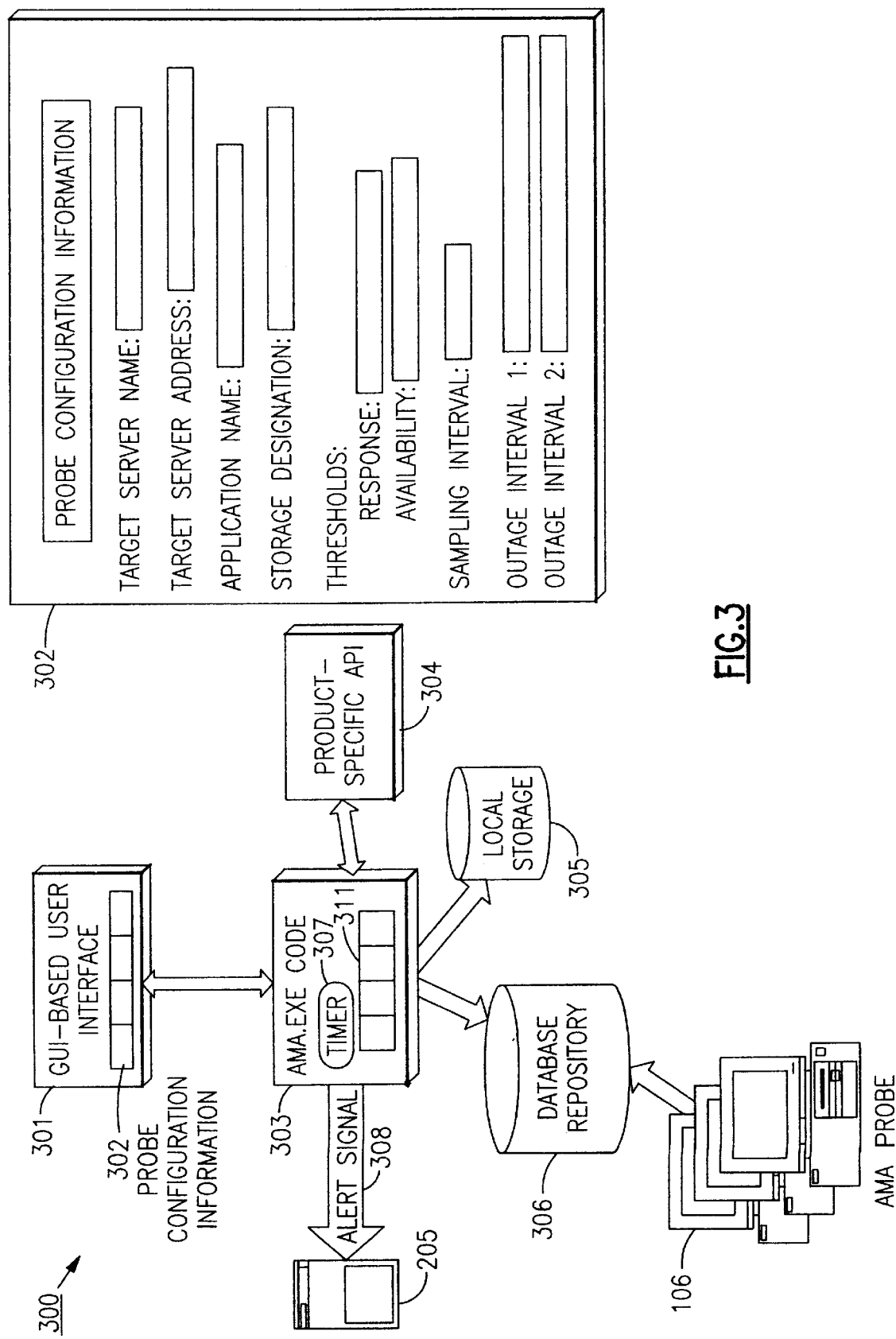
FIG. 3 more specifically depicts a sequence of operations included in the single probe implementation including the provision of an interface for probe configuration information, the interaction between the probe code and an application program on a server computer, the generation and storage of transaction records and the generation of alert signals.

Referring now to FIG. 3 it can be seen that these configuration facilities include a GUI-based front-end 301 which is provided to elicit information pertaining to the function of the probe (.i.e., probe configuration information 302) from the party responsible for the implementation of the AMA probe (i.e, from the end-user). In an exemplary embodiment, the probe configuration information 302 will include the name of the server computer 202 including the application program 203 for which monitoring is desired (i.e., the target server name), the network address of the target server and the type of application on the target server to be monitored (for example Lotus Notes). This basic set of information is necessary to establish the initial sequence of network communication operations comprising the aforementioned transaction sequence undertaken by the AMA probe 201 including the generation of a service request from the AMA probe 201 on the client computer 106 to an application program 203 on a server computer 202.

Further items of probe configuration information 302 which may be elicited in an embodiment of the present invention include access control and authentication information, if required, for accessing secured transactions (i.e., such information as user identification and password), as well as instructions regarding the processing of the information gathered based upon the service responses 211 of the application program 203.

The information required for processing the service responses 211 from the application program 203 on the server computer 202 may include, without limitation, a storage designation, indicating the repository 204 for storing information regarding the completed transaction (i.e., the transaction records). As previously noted, this repository may be local 305 to the client computer 106 and/or a remote central repository 306 on the network 200 which stores data gathered from multiple probes 201 monitoring multiple application programs 203 on multiple server computers 202. In a preferred embodiment of the invention, storage operations may be undertaken both local 305 to the client computer 106 including the AMA probe 201, and remote on the network 100 at the central repository 306, and the repository designations will be provided for both repository locations 305, 306.

In still a further embodiment of the invention, probe configuration information 302 would be elicited for determining the sampling frequency for generating the service requests 210 to the application program 203 on the server computer 202. It will be further appreciated that the AMA probe 201 may be instructed to monitor multiple application programs 203 either on the same or on different server computers 202. In such an multiple monitoring implementation, the sampling frequency may be defined locally for each application to be monitored or globally for all or for a portion of all of such applications 203 monitored by the probe 201 on the client computer 106.

As previously noted, a preferred embodiment of the invention comprises facilities for generating an alert signal 208 for actuating an alerting mechanism 205 signaling the violation of pre-defined performance criteria. Accordingly, such an embodiment will require the establishment, as a part of the probe configuration information 302, of these pre-defined performance criteria. For example, it would be a simple matter to define a maximum allowable response time for receiving a successful service response from a monitored application program 203. As will be subsequently described, the AMA probe 201 generates a transaction record including the duration of the transaction cycle from service request to service response. If this duration exceeds the pre-established threshold, an alert signal 208 will be generated by the AMA probe 201 and forwarded to the alerting mechanism 205.

In an embodiment of the invention wherein it is desired to establish an availability threshold for an application program 203 as part of the probe configuration information 302 which when exceeded will trigger the generation of an alert signal 208, the process may be implemented by determining a maximum number of successive unsuccessful service responses received by the AMA probe 201 from the application program 203 on the server computer 202.

A particular configuration of the AMA probe 201 for determining an availability performance criteria for the application program 203 might entail, for example, the establishment of an availability threshold designed in accordance with the foregoing description, coupled with configuration information instructing the probe 201 to immediately, upon the receipt of an unsuccessful service response 211, re-initiate the service request 210 until either a successful service response 211 is received or the threshold is exceeded and an alert signal 208 is generated. In this manner, it is possible to closely relate the generation of an application availability-based alert signal 208 with the loss of the availability of a particular application program 203, depending of course upon the defined sampling interval 302 for generating the initial service request 210.

Since any server computer 202 on a distributed computer network 100 will require periodic maintenance which often requires that the server computer 202 is not available to provide application services to client computers 106 on the network, it would be advantageous to account for such known "service outage intervals" so as not to perform application monitoring during these intervals or alteratively to condition the results of monitoring done during the maintenance outage periods by associating these results either with a flag or other indication that these results were obtained during such an outage interval. Moreover, it may simply be the case that the application program 203 is not run continuously but only at certain scheduled times. Accordingly, a further embodiment of the invention would elicit such information as the availability schedule for the application program 203 as part of the probe configuration information 302.

Each of these aforementioned items is included in the probe configuration information 302 of a preferred embodiment of the invention which are collected by the GUI-based AMA probe interface 301 depicted in FIG. 3 and further illustrated in tabular form in FIG. 3. In accordance with the illustration in FIG. 3, probe configuration information 302 collected by the interface 301 is provided to the executable portion of the AMA probe 303 on the client computer which in turn functions by generating service requests 210 to the identified application program 203 on the target server 202 in accordance with the configuration information 302 provided by the GUI 301.

Considering once again our exemplary embodiment wherein a Lotus Notes application program 203 on a server computer 202 is to be monitored by the AMA probe 201. Once the probe configuration information 302 has been entered into the graphical interface 301, the AMA probe executable code 303 resident on the client computer system 106 utilizes an application program interface (API) 304 for the application program on the server computer, in the same manner as an end-user client seeking the services of the application program 203 over the network 200. However, the frequency of access, userid, password, etc. with which the probe code 303 requests the service response from the application program interface 304 are dictated by the probe configuration information 302 supplied through the graphical interface 301. In the case of the Lotus Notes application 203 the AMA code 303 utilizes the Notes APIs 304 included in Lotus VIM (Vendor Independent Messaging) API Toolkit.

In an illustrative embodiment of the invention including the Lotus Notes-based monitor, the transaction between the probe 201 and the application 203 entails a request from the probe to the Lotus Notes database server to open a Lotus Notes database file called README.NSF. This transaction, while not a common user request for a Lotus Notes database, mail or hub server, is indicative of the availability and response time of the application program in general. Such a simplistic service request 210 is ideally suited for monitoring proposes in the present invention, since it is not required to authenticate the requesting session via a password to secure a successful response 211. Furthermore, this particular service request 210 does not necessitate processor-intensive operations at the server computer 202, and accordingly the transaction which is iteratively performed over the computer network 200 does not materially impact the overall performance of the server computer 202 for other client computers 106 on the network 100. It will of course be understood that the choice of the particular transaction to be monitored is to be left to the entity administering the probe and is not in anyway to be limited by the particular description herein.

The completion of such a client-server transaction comprising the service request 210 and the service response 211, culminates in the generation of a transaction record 311 which is forwarded via the AMA probe code 303 to a storage repository 305, 306. The transaction record 311 includes information regarding the transaction, such as whether the application program 203 has successfully responded to the service request 210, the total duration of the transaction cycle from request to response, the time of day of the service request and any other metric which may be of interest to the entity seeking to monitor the particular application program 203.

In determining the cycle duration, a timer mechanism 307 is included in the AMA probe code 303. In a preferred embodiment of the invention the timer mechanism 307 may simply be a mechanism which places a time signature on the initial service request 210 from the probe 201 and another time signature on the service response 211 at the probe 201 and which records the difference between these two time signatures in a transaction record 311. In the preferred embodiment including the Lotus Notes monitor, availability and response time are the key metrics for which data is included in the stored transaction record 311. An exemplary transaction record from the AMA probe 201 is illustrated below:

| Meas Date | Monitor Local Time | Target Server | TgtSrv Type | Srv Loc | Monitor Name | 0 = F 1 = S |
|---|---|---|---|---|---|---|
| "05/28/1997" | "19:54:40" | "D02DBE01" | "SPM" | "SBY" | "SBY" | "1" |
| | IP Ping Time "0.000000" | Notes DB Resp. Time "1.281000" | | | Request Intervl "6" | |

It will be observed in the above-listed transaction record that the particular transaction recorded a successful service response (wherein a "1" is recorded in the field "0=F, 1=S) and the response time was 1.281000 seconds for the transaction.

In addition to providing transaction records to the repositories 304, 305, an additional feature of the present invention provides the real-time results of the transaction back to the relevant fields of the GUI-based interface 301. In this manner, a user may view the response time and availability information corresponding to each transaction once the AMA probe code 303 has processed the transaction record, if desired, by viewing the GUI-based fields 301.

As has been previously discussed, the records from the transactions may be stored locally in a repository 305 on the client computer and/or remotely in a centralized repository 306. The instructions for such storage operations are included in the probe configuration information 302 designated at the graphical interface 301 level. In an alternative embodiment it is possible that the records will not be stored in any repository. This would be the case, for example, wherein only alerting of violations of performance criteria is desired from the probe or wherein only real time transaction information is of interest to the network administrator. Such implementation choices are a function of the desired objectives of the application monitoring project and all are enabled by the present invention.

Referring again to FIG. 3 it will be further appreciated that upon generating the transaction record, the probe 201 further performs threshold comparison operations required to determine whether any of the interface-based (301) predetermined performance criteria have been violated. If it is determined that one or more of these criteria have been violated, an alert signal 308 is generated by the probe 303 and forwarded to the alerting mechanism 205 for informing service personnel of the violation incident.

Figure 4:
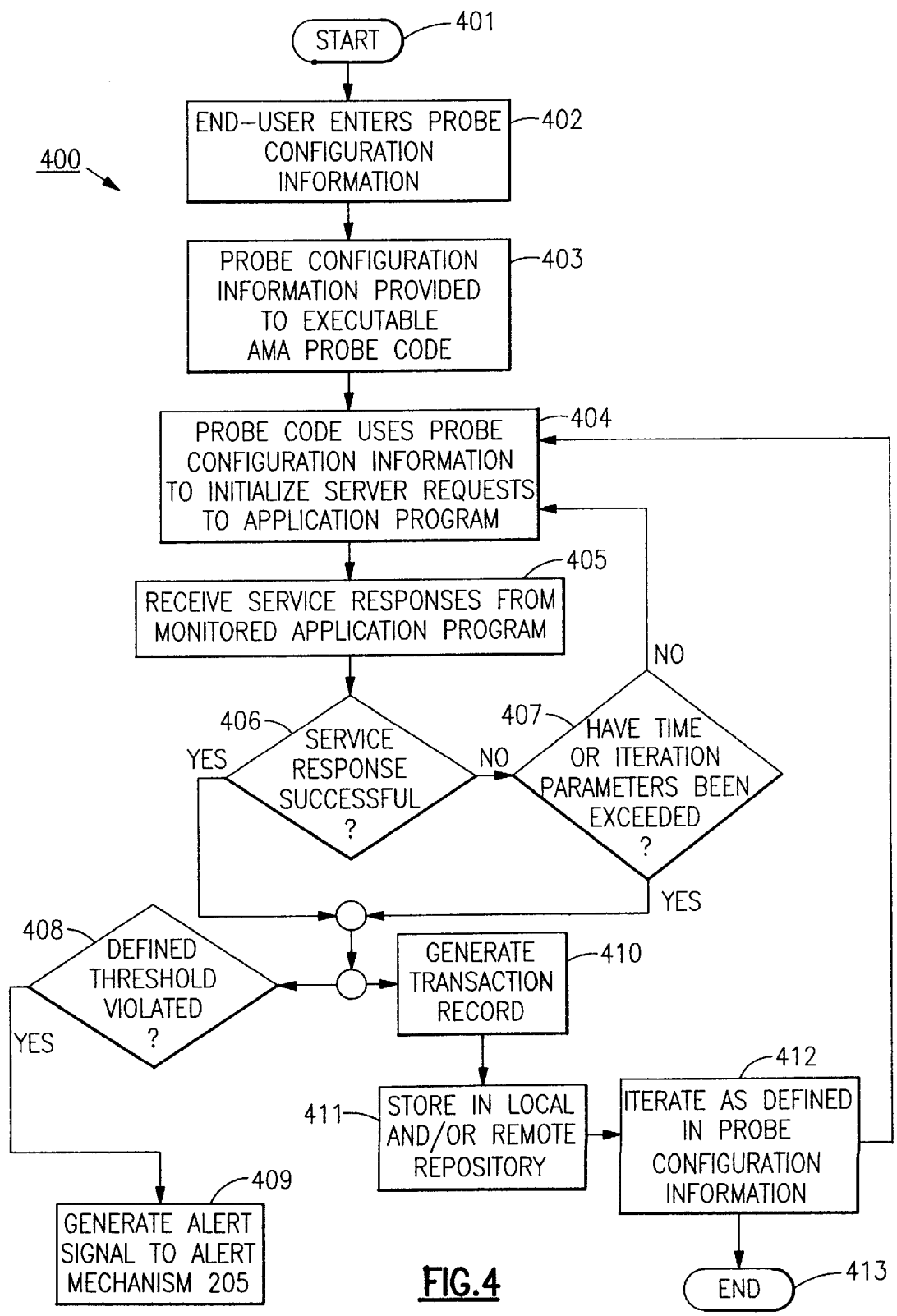
FIG. 4 includes a flow diagram for illustrating the iterative service request and service response interaction between the AMA probe on the client computer and the application program on the server computer and the generation and storage of transaction records.

FIG. 4 summarizes the steps involved in a processing a client-server transaction 400 in accordance with the present invention. The process is initiated at step 401 and proceeds to step 402, where the client computer system including the AMA probe software 201 prompts a network-user via a GUI template 301 or otherwise to enter the probe configuration information 302 to control the function of the probe code 303. Next in step 403, the probe configuration information is provided to the executable portion of the AMA probe code which uses the information to initiate a series of service requests 210 in step 404 to a monitored application program 203 on a target server computer system 202. As previously noted the target server 202 and application program 203 are included in the information provided to the AMA probe code 303 via the template 301 in step 402.

The service requests 210 generated by the probe elicit service responses 211 which are received by the probe code 303 in step 405. Next in decision box 406 the code 303 determines whether the service response is successful. As previously described, in the case of successful service responses, the probe receives an indication that the service request was received by the application program and is being fulfilled. In contrast, an unsuccessful service response may correspond to either no service response from the application program prior to the expiration of a pre-defined time-out period or alternatively to a service response from the application program indicating that the service request is not being fulfilled. In the event that an unsuccessful service response is received by the probe 303, the probe may respond (depending upon the set-up of the probe via the probe configuration information 302) by immediately retrying the service request 404, the retry operation, if enabled could comprise a single or multiple retry attempts which may be bounded by either number of retries or a retry time period as is indicated at decision point 407. Upon exceeding the determined retry interval without eliciting a successful service response, a transaction record for an unsuccessful service response is recorded 410.

In either case, whether the service request produces a successful or unsuccessful service response, a determination may be made as to whether any pre-defined thresholds, which have also been defined in the probe configuration information in step 402, have been violated 408. If it is determined that such thresholds have been violated, an alert signal is generated by the probe 409 and passed to the alerting mechanism 205.

Concurrently, or subsequent to the threshold determination 408, a transaction record 311 is generated by the AMA probe code 303 in step 410. The transaction record 311, as illustrated above, includes information pertaining to the specific transaction (i.e., the service request and response cycle) that has just completed. The transaction record is next stored in a local and/or central remote repository 305 and/or 306 in step 411. The cycle beginning with the initiation of a successive service request ins step 404 is repeated in step 412 if iteration has been instructed and at the frequency defined by the probe configuration information. Finally, the process may be viewed as being bounded by ending block 413.

In accordance with the foregoing description it can be seen that the AMA probe 201 may be implemented to generate transaction records 311 which are iteratively appended to a repository which may be local 305, or centralized 306. The centralized version of this repository 306 will include a history of application service transaction records 311 for each monitored application program 203 on each server computer 202 being probed in a distributed computing system 100. A further feature of the present invention relates to a method, system and program product for providing this stored information to users of the distributed computing environment 100. Another feature of the present invention relates to a method, system and program product for processing the alerts 308 generated by the AMA probe code 303 and for reporting the alert conditions to support personnel.

Figure 5:
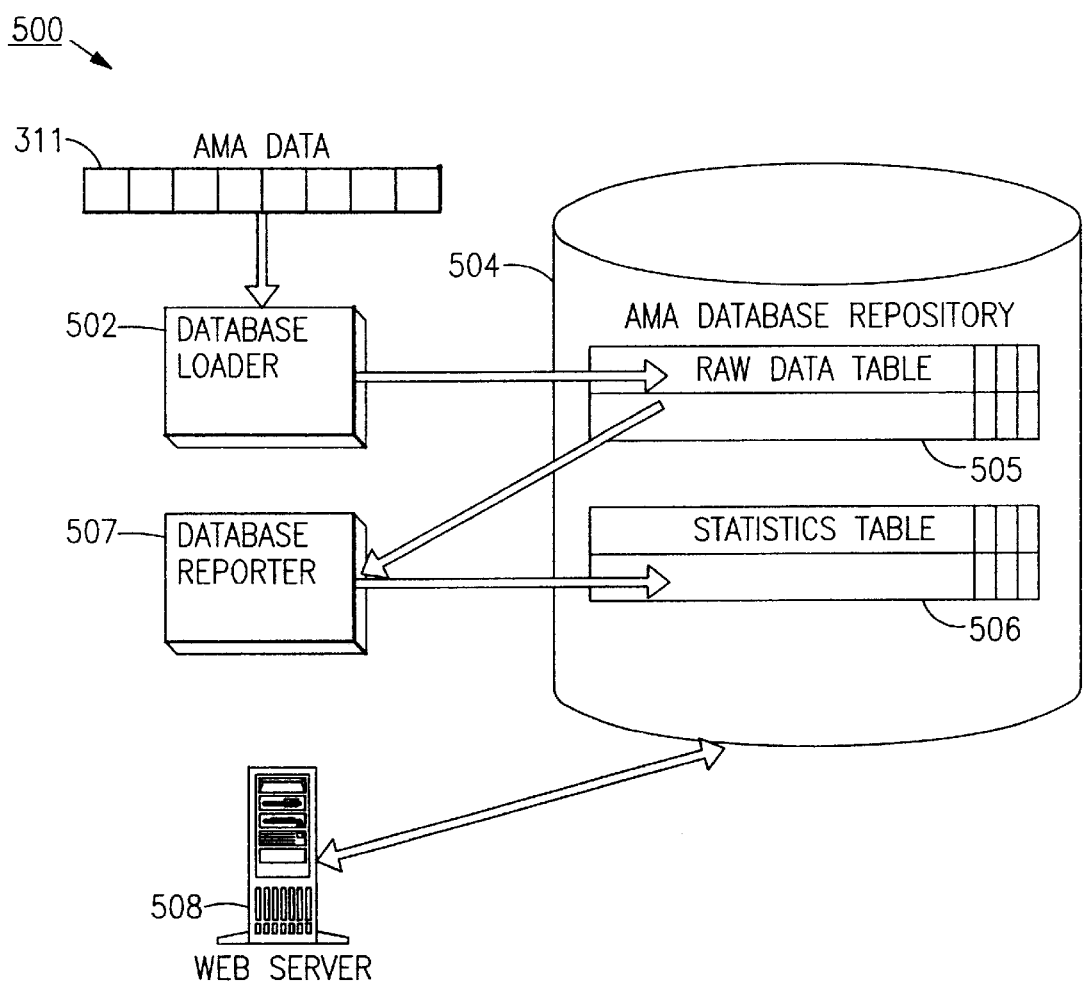
FIG. 5 depicts the storage of a probe-generated transaction record in a central repository as well as the scheduled statistical processing of the transaction records into statistical data loaded into the statistics table in the central repository.

Referring now to FIG. 5 we are presented with an overview of the implementation and organization of the centralized data repository 504 used for storing and providing reports for applications service transaction records 311. More specifically, FIG. 5 illustrates the insertion of real-time transaction record data 311 from the probe code 303 into the centralized data repository 504 and the generation of statistical data 506 based upon the inserted real time data 505.

In operation, a transaction record 311 is generated by the AMA probe code 303 at the conclusion of a transaction cycle. The record is provided to a database loader module 502 which inserts the real-time transaction record data into the raw data table 505 in the centralized AMA data repository 504. Record insertion from the database loader 502 is actuated upon the receipt of a transaction record 311 from any of the probes 201 running on client computers 106 in the distributed network 100. As such, it can be seen that the raw data table 505 of the repository 504 includes real time data provided at approximately the time that the transaction records 311 are generated by the probe code 303 in addition to any inherent latency associated with passing such data over the network 100.

As a consequence of the application monitoring activities undertaken by the AMA probes 201, there exist identifiable sets of statistics, based upon the raw data 505, which are known to be of interest to end users of the network 100. These statistic sets include, for example, the percentage of successful service responses 211 per the total number of attempted service requests 210 in a determined interval of time. This pre-determined time interval typically coincides with the SLA between the network administrators and the network customer (for example this interval would typically correspond to a prime-shift work day as defined by the SLA). Alternatively, statistical processing may be actuated upon the receipt of a defined number of transaction records 311 into the raw data table 505, such that upon receiving 250 transaction records into the table the statistical processing for the received 250 records will be initiated. Of course, this numeric threshold may be further divided into the receipt of a number of records corresponding to the monitoring of a specific application program 203 on a specific server 202 etc.

By processing raw data 505 within the central repository 504 at meaningful intervals, the desired statistical sets of data 506 are made readily available to an end-user who may wish to ascertain some measure of the performance of the application(s) 203 on the network 100. From the vantage point of such an end-user seeking a report on the performance of applications being monitored, the raw data in table 505 is periodically pre-processed into statistical sets of data 506.

Since the provision of real-time statistical computation may be a processor-intensive task, this pre-processing of statistical information provides an efficient reporting mechanism to the end-users of the network who are querying this information.

The pre-processing of the statistical information is enabled via the function of the database reporter 507. At pre-defined intervals the reporter accesses the data inserted into the raw data tables 505 by the database loader 502 and processes the information thereby generating the defined sets of statistical data which it then inserts into statistic tables 506 for access by end-user queries.

The database reporter 507 is actuated at intervals coinciding with the establishment of a requisite set of raw data for formulating the sets of statistical information. For example, in a preferred embodiment of the invention, a calculation is performed at the conclusion of each business-day prime-shift (i.e., 7:00 AM–6:30 PM) based upon raw data which has been iteratively generated at probes 201 and inserted by database loader 502 into the in raw data table 505 of the central repository 504. Alternatively, as previously noted, the calculation may be performed based upon receipt of a defined number of transaction records 311 at the raw data table 505.

This inserted raw data corresponds to transaction records 311 from AMA probe code 303 which has been monitoring application programs 203 during this interval. At the conclusion of this interval, it is a simple matter to provide the newly inserted raw data to the database reporter 507 which in turn will pre-process the data to provide statistical records on the availability of each probed application program during that interval (i.e., by determining the percentage of successful service responses recorded for each application during the interval). Moreover, the statistical information may additionally include a range of the response times recorded for the pre-processing interval. The pre-processed statistical information is then provided to the statistics table 506 of the central repository 504. In this manner this information is calculated only once and may be quickly provided to an end-user querying the central repository. The types of statistics inserted into the statistics table 506 will be more apparent via subsequent discussions regarding the front-end GUI's provided to a viewer of the central repository 504 as described with respect to FIGS. 7–14.

In an exemplary embodiment and as will be subsequently described via reference to FIG. 6, an end-user may receive this stored information over a web-browser application program by coupling to a web server program 600 within web server computer 508 which may access the statistical information stored in the central repository 504 without the need to process the statistical information on demand.

Figure 6:
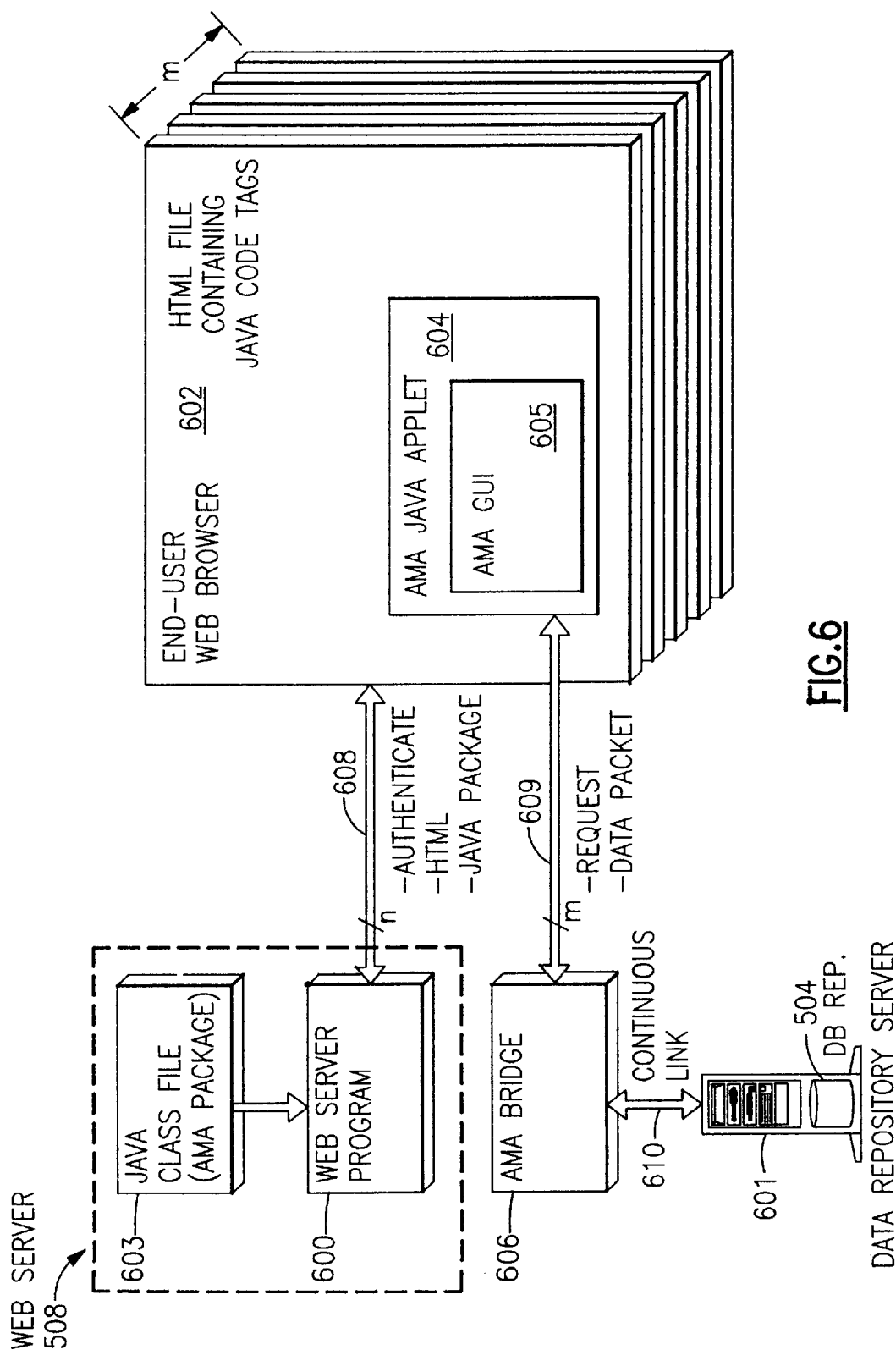
FIG. 6 presents a block diagram illustrating the function of the web server computer in providing, upon request, applets for the graphical user interface to a web browser on a viewer's computer and the fulfillment of requests generated by the viewer by interacting with the graphical interface on the viewer's computer, the request being handled via the software bridge element for accessing the data stored in the central repository on the database server computer.

Turning now to FIG. 6, the function of the web server computer 508 is further illustrated. The central repository 504 resides on a database server 601. The end-user seeking to ascertain application program performance data on the network, establishes a session 608 with web server program 600 via a web browser application program 602 on a computer system such as client computer system 106 (which may or may not include the AMA probe code 201), which is capable of coupling to the database server 601 and the web server program 600 in web server computer 508. In a preferred embodiment, the web server program 600 stores a software package 603, which may be a Java(tm) class file. The software package 603 is provided upon request to the end-user computer 106. Upon receipt at the end-user computer 106 it is interpreted by the web browser 602 to provide the AMA Java applet 604 which in turn functions to provide a graphical indication of the desired performance data to the end-user over the web browser 602 (Java is a trademark of Sun Microsystems Corporation). When an end-user communicates with the web server program 600 via a uniform resource locator (URL) an authentication process 608 is initiated based upon the information provided from the web browser program 602. Once authenticated, HTML code is provided 608 from the web server program 600 to the web browser 602, after which the Java-based software package 603 is provided 608 to the web browser 602.

At the end-user computer the received Java package 603 is interpreted by the web browser 602 which creates the AMA Java applet 604. The AMA Java applet 604 serves as the interface between the end-user and the data stored in repository 504. The AMA Java applet 604 includes a GUI (AMA GUI 605). The AMA GUI 605 comprises a set of graphical and tabular objects which are used to assist the end-user in requesting data 609 and analyzing the data subsequently retrieved 609 from the database repository 504 on database server 601. As part of the interpreting of the AMA applets 604, the session 608 established between the end-user computer 602 and the web server program 600 is terminated. Upon termination, the web server 508 need not be utilized to perform computations and communication required for accessing the data stored in the repository 504, accordingly, the web server 508 is available to serve other end-users seeking establish a session therewith.

The end-user computer 106 next generates requests for data via the AMA GUI 605 from the repository 504 which has the effect of initiating a temporary data link with the database server 601 for receipt of the data stored in the repository 504. The AMA bridge 606 is a software-based interface mechanism which is logically coupled via a continuous communication session 610 to the repository 504. The bridge 606 is given access to a portion of the repository which is intended to be accessed by end-users via web browser 602 running the AMA applets 604. It will be recalled that authentication of the end-user was accomplished during session establishment 608 between the web browser 602 and the web server program 600. As such, there is no need to authenticate an end-user's access to the repository 504 through the bridge 606. The AMA bridge 606 manages the high-speed bidirectional data link 609 between the end-user session 602 and the repository 504 on database server 601 through the AMA applets 604. In this manner the data-intensive graphical presentation materials for graphically representing the probe monitoring results via the AMA GUI 605 are provided as a packet 603 of software locally implemented 604 at the end-user's web browser 602. The comparatively limited data corresponding to the probe monitoring results stored in repository 504 is transferred between 609 the database server 601 and the end-user's computer 106. This data is processed by the AMA applet 604 for display via the AMA GUI 605.

The temporary user-to-database data link 609 is actuated by the user's interaction with the AMA GUI 605 included in the AMA applet 604 on the user's web browser 602. For example, by clicking on templates 605 displayed locally on the user's web browser 602, the user causes his/her computer 602 to request data stored in the repository 504 on the database server 601. The AMA bridge software 606 serves an interface for the high-speed transfer of the relatively limited data communicated via data link 609 between the end-user web browser 602 and the repository 504 on database server 601. The bridge software 606 is implemented as a daemon continually logically coupled via a communication session 610 to the repository 504, and in an exemplary embodiment may physically reside on the web server 508 or on the database server 601 or on an intermediate computer (not shown). The bridge daemon 606 provides services for the applets running on the end-user web browser 602 accessing the AMA GUI 605. The bridge 606 receives requests from the end-users through the GUI 605, and responds with the appropriate data from the repository 504.

Using Java Database Connectivity (JDBC) the bridge daemon 606 is continually connected 610 to the repository 504 such that multiple requests to the repository do not require the creation of multiple database processes (as would be the case if another form of access such as via Common Gateway Interface (CGI) were utilized). Accordingly, multiple requests from any number of end-users are managed via a FIFO queue (or otherwise) through the bridge daemon 606. As such the bridge daemon 606 provides an efficient mechanism for connecting the end-user directly to the central repository 504.

It will be further understood that multiple end-users (n) may each access the web server program 600 at a given time and may each be provided with the Java class files. Accordingly, since the session between the end-users and the web server 508 is terminated upon the provision of the Java packet 603, over the course of time a great number of end-users (m where m may be>>n) may locally implement the AMA applet 604 including the AMA GUI 605 and may establish data links 609 to the bridge element 606. The single continuous communication session 610 established between the bridge element and the repository 504 will serially couple the m end-user computer 106 to the data stored in the repository 504 by sending the requested data over the m data links established between the end-user computers and the bridge 606.

Upon establishing a session 608 with the web server program 600, an end-user indicates via a main menu template provided in web server program 600, which monitored application(s) on which set of servers he/she is interested in. The web server program 600 receives this information and provides 608 the appropriate Java packet 603 required for creating the appropriate AMA applets 604 including the AMA GUI 605 on the end-user's web browser 602. The end-user's interaction with the AMA GUI 605 executing locally within the web browser 602 on his/her computer 106 actuates data link to the bridge daemon 606 which is continually coupled to the repository 504 and which manages the data exchange therebetween.

From the foregoing descriptions it will be readily apparent that the database repository 504 may typically include voluminous sets of transaction records 311, 505 and statistical data 506 relating to the performance of a plurality of monitored application programs 203 which have been/are presently being monitored by a plurality of AMA probes 201 executing on a plurality of client computers 106 on the distributed computing network 100. It will be further appreciated that the usefulness of this stored data 504 is directly related to the facility with which the data may be analyzed. Accordingly, a further feature of the present invention comprises graphical display facilities for presenting the stored application monitoring information 504 to an end-user in an easily comprehensible fashion.

In particular, the present invention provides interactive report generation and graphical presentation facilitates enabling a viewer to query and obtain graphical and tabular data corresponding to monitored application program performance on the distributed network 100 at both a high level wherein, for example, the availability and response time of multiple servers running an application program or multiple application programs is displayed on the basis of performance data gathered over a month or a longer time period, and at levels of increasing granularity ranging to the level of a display or table comprising data corresponding to the hourly performance of a specific server running a specific monitored application program. Each of these levels of data in each of the tables or graphs is dynamically linked to successive tables and graphs and to previous tables and graphs having a broader and/or narrower views of the data that is to be analyzed as desired by the viewer. Traversal of these linked tables and graphs provides a user-friendly querying tool for retrieving stored data from the central repository 504 and for displaying the data at different levels of specificity in a manner that is readily user-comprehensible.

Notwithstanding the fact that the ensuing description will refer to interactions with the presentation system by way of computer mouse operation, it will be understood that within the present invention the viewer is provided with the ability to interact with these graphical or tabular representations by any known computer interface mechanisms, including without limitation pointing devices such as computer mouses or track balls, joysticks, touch screen or light pen implementations or by voice recognition interaction with the computer system. The user interaction specifies the successive levels of data to be displayed to the viewer.

Turning now to FIG. 7–12 we are presented with an exemplary sequential set of viewer interactive graphical and tabular presentations which are implemented as a portion of the AMA GUI 605 in a preferred embodiment of the invention.

Figure 7:
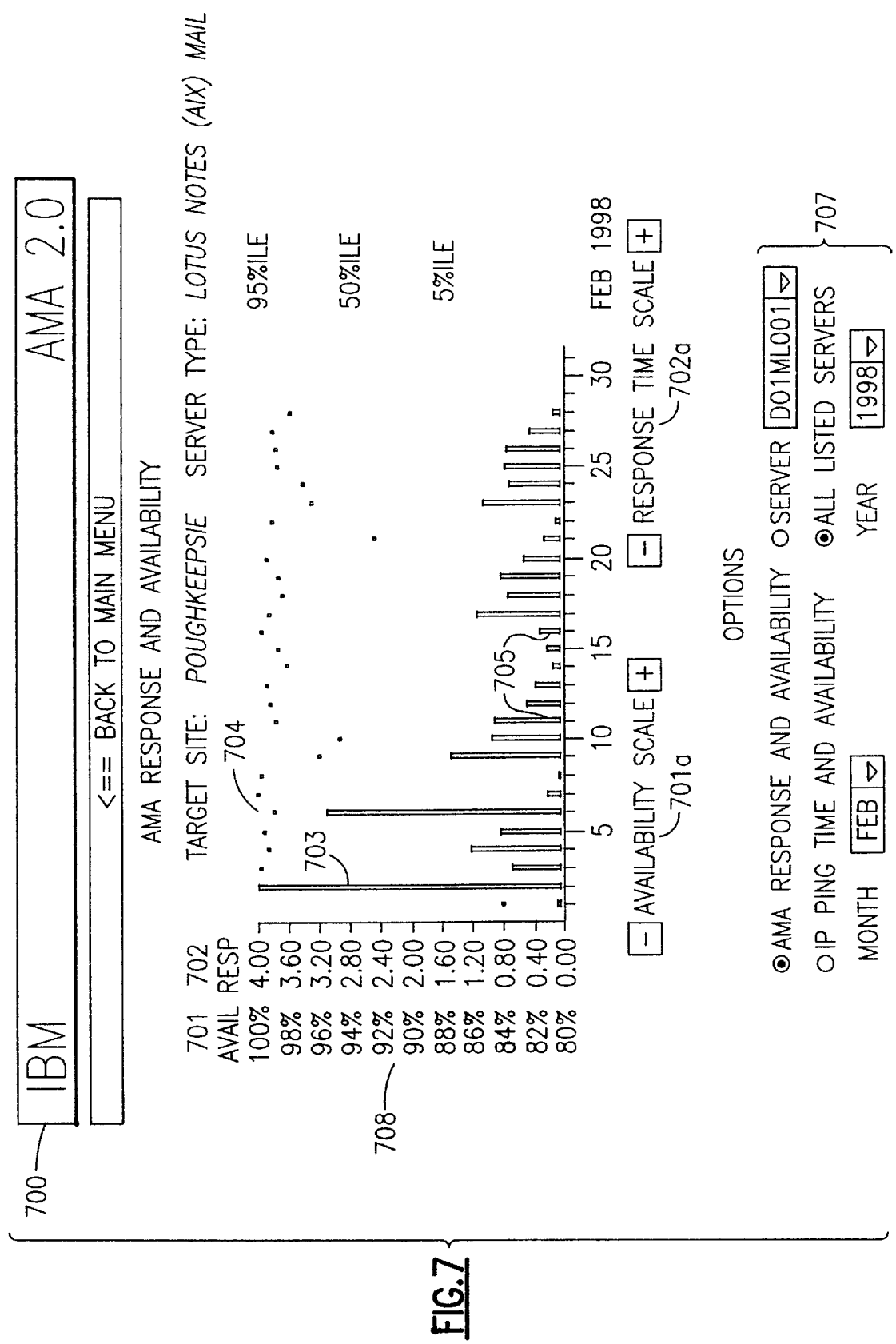
FIG. 7 and 7a illustrate a display screen for a front-end graphical user interface for the viewer's computer showing scalable measurements of application availability and response time for a Lotus Notes application program running on all listed servers for the Poughkeepsie site for the month of February 1998.

The graph 700 in FIG. 7 is generated by when a user fills out the template fields illustrated 707 along the bottom of the graph 700. The fields 707 include the AMA features to be displayed (response time and availability in the illustrated example), the server (or all servers as in the example) running the application program for which monitoring results are to be displayed and the time period for the monitoring (February 1998 in the example).

By filling in these fields, the user causes the AMA GUI 605 to generate a request to the bridge daemon 606 which in turn queries the repository 504 and returns this information back to the GUI for display in graph 700. It will be understood as we proceed to describe the features of the following dynamically linked displays in FIGS. 7–12, that the interconnecting links or active areas on each table or graph, when actuated by the user to traverse the subsequently described series of graphs and tables, each cause a request for data to pass from the AMA GUI 605 to the bridge daemon 606 and further cause the querying of repository 504 by the bridge daemon 606 and the return of the requested data therefrom to the GUI 605, which in turn assembles the returned data via the AMA applet 604 into a display format such as shown in the graphs and tables of FIG. 7–12.

Figure 7A:
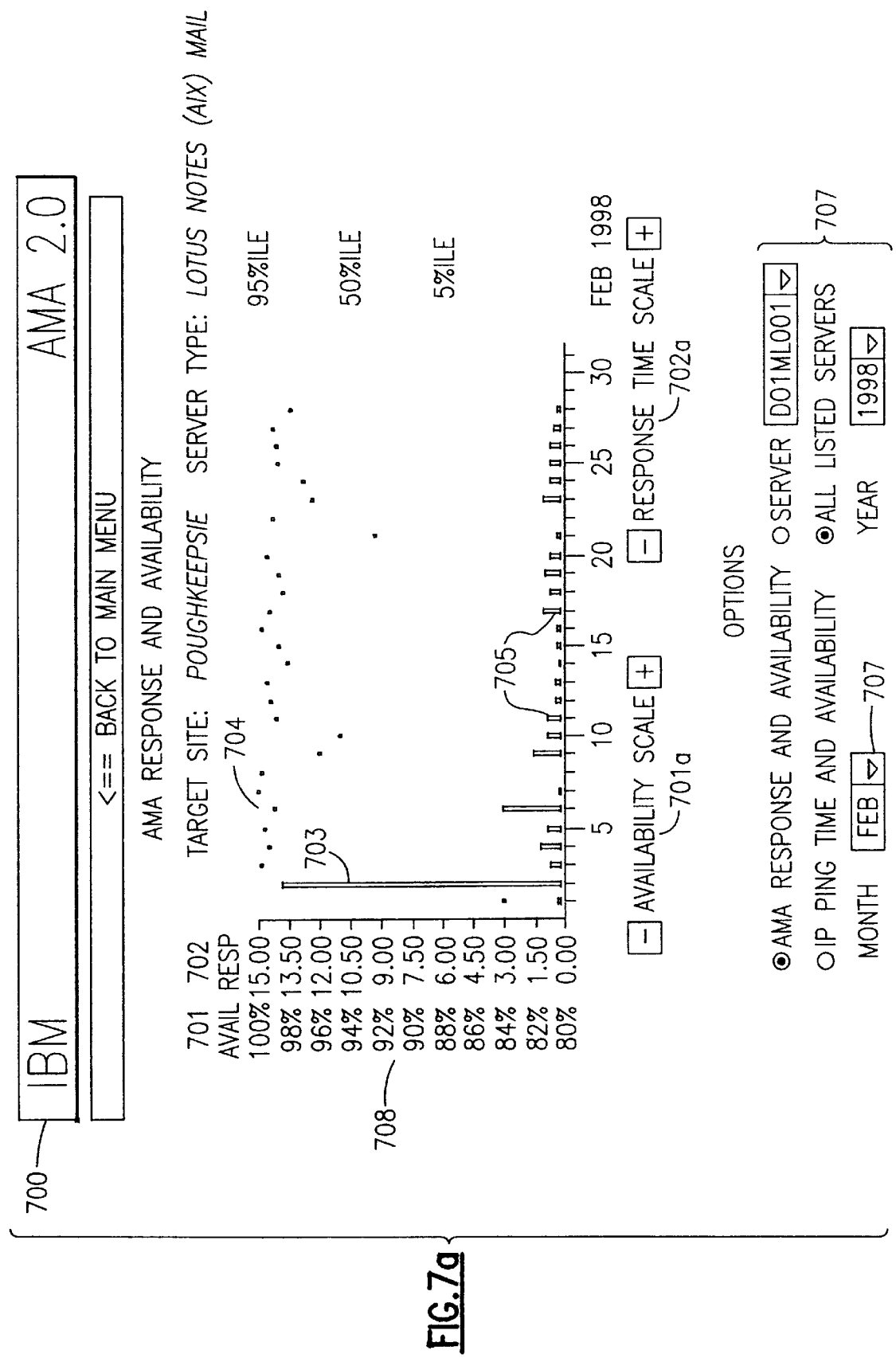

With the foregoing descriptions in mind we now turn to FIG. 7 which illustrates a graph 700 showing the response time and availability for a Lotus Notes mail application on a set of AIX servers for the month of February 1998 (Lotus Notes (AIX) Mail). The X-axis of the graph 700 corresponds to the days of the month. The Y-axis of the graph indicates a first scale 701 corresponding to an indicia of percent availability per day of the month of the monitored Notes application, and a second scale 702 corresponding to an indicia of the response time (in seconds) for the monitored application transaction. The ranges for response time and availability can be scaled up or down as desired by clicking on the "+" and "−" representations shown for each scale 702a and 701a respectively. For example, FIG. 7a shows the same graph 700a having an expanded response time scale 702 by "zooming out" via the "+" feature of 702a.

Referring again to FIG. 7, the graph 700 includes bars 703 which correspond to the response time measurement and data points 704 corresponding to the availability measurement. The bar representations 703 include a color-coded mid-point 705 corresponding to the $50^{th}$ percentile of response times of the monitored application per day. In other words, the response time measurements for the day in question span a range (for example from 0.1 seconds to 10 seconds) for the application program's response 211 to service requests 210, and the mid-point 705 represents the response time measurement for which half of the remaining daily measurements were higher (slower) and for which the other half of the remaining daily measurements were lower (faster). In the illustrated example, the bar 703 graphically displays the response times measured for the day in question excluding the fastest 5% and the slowest 5% (i.e., the range spans response times in the $5^{th}$ to $95^{th}$ percentile or as otherwise defined by an SLA). The points 704 indicate a single data point for each day corresponding to the percentage of service requests 210 which received a successful service response 211 for the day in question.

Referring to the specific graph 700, for example, we see that on Feb. $2^{nd}$ the response time indications correspond to a range of response times from 0.1 seconds up to and presumably beyond 4.0 seconds and a $50^{th}$ percentile falling around 0.1 seconds. This indicates that most of the response times on Feb. 2, 1998 were clustered in the area of tenths of a second. Likewise on Feb. $2^{nd}$ the graph 700 indicates that application availability was around 98%.

In accordance with the foregoing it will be noted that the graph 700 includes "hot points" (704 for example) or "active areas" which are interactive portions of the graph. These hot points are hyperlinked or otherwise interactively connected to related graphs and tables which permit the viewer to dynamically examine a particular point of interest on the graph 700 in greater detail. For example, if a viewer were to perform a mouse click after placing his/her mouse pointer on the background area 708 of the graph (i.e., not on an area showing data for a particular day, which will be subsequently addressed), the viewer would be initiating a request for the data corresponding to a tabular representation of the data illustrated in graph 700 and would correspondingly be presented with the table 800 illustrated in FIG. 8. Thus, it will be understood that the background 708 of the graph 700 is an interactive hot point.

Table 800 shows a tabular form of the data used to create the graph 700 which is useful in that it provides a more precise reading of data corresponding to a particular day 801. To illustrate we can examine the data for Feb. $2^{nd}$. From the table 800 we can now see that the fastest response time 802 was actually 0.071 seconds and significantly, that the slowest response time 803 was 14.062 seconds (the graphical representation 700 is bounded at 4.0 seconds but could be re-scaled using the aforementioned scaling feature 702a as illustrated in table 700a showing response time in the range of 14 seconds for Feb. $2^{nd}$). Additionally, the availability data per day 804 and mid-point response time 805 per day is listed in tabular form. A mouse-click on the table 800 dynamically returns the viewer to table 700.

Figure 9:
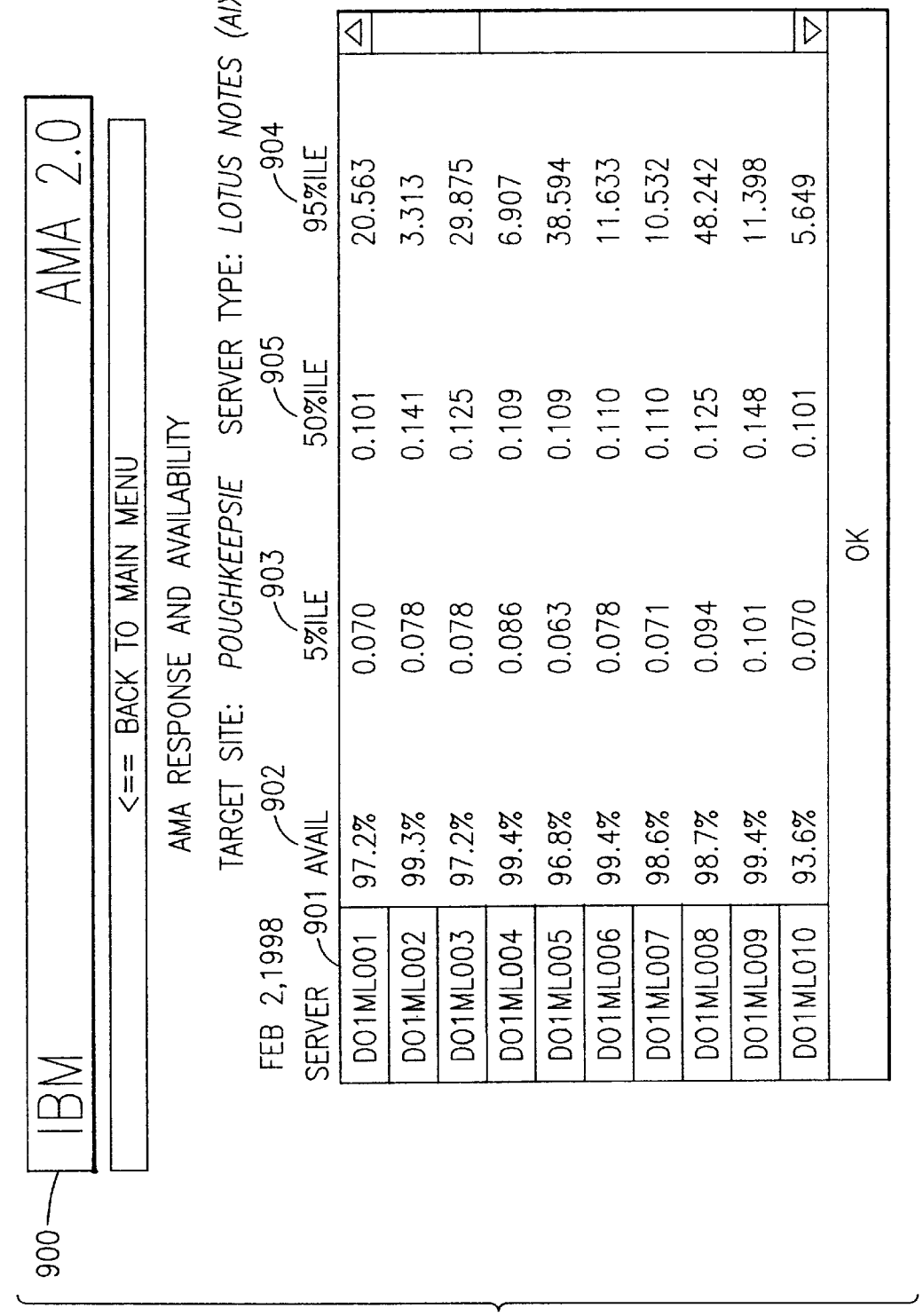
FIG. 9 illustrates availability and response time data for each of the Poughkeepsie site servers running the Lotus Notes application program on Feb. 2, 1998.

If a viewer wished to discern at which server and at what time of day the slow 14.062 second response time illustrated on the on the graph 700, 700a and table 800 occurred, they would place a mouse pointer on the bar 703 or row 801 representing that day, and by clicking on his/her mouse, the AMA GUI will dynamically query the repository 504, retrieve the relevant data, and present the viewer with table 900 shown in FIG. 9.

Table 900 illustrates availability and response time statistics for each server that is represented on graph 700 for the day of interest (i.e., Feb. 2, 1998). Each server is represented by a hyperlinked or otherwise dynamically related button 901 (hot point) on the left portion of table 900. The table comprises columns representing availability percentages for the day 902, as well as the 5% (903) and 95% (904) and mid-point (905) response times for the day.

By illustrating the statistical performance of each server in table 900 it is now possible to easily determine which server or servers exhibited poor response time on the day in question. These servers are the machines responsible for causing the graphical representation of poor response time on graph 700 which is a composite of the servers shown in the table 900. Of course, it will be understood that many of the 95% response times for each of the individually listed servers will not be displayed in the 95% response time for the combined server display on graph 700.

This exclusion, it will be understood, is merely a detailed implementation choice, however, it was included in the preferred embodiment due to the fact that it was discovered that the inclusion of these outlying data points (i.e., response times) skewed the graphical representation of the majority of the monitoring data for the period in question. As such, by excluding these outlying points it was found that the displays more accurately represented the typical performance of the monitored application programs.

Figure 10:
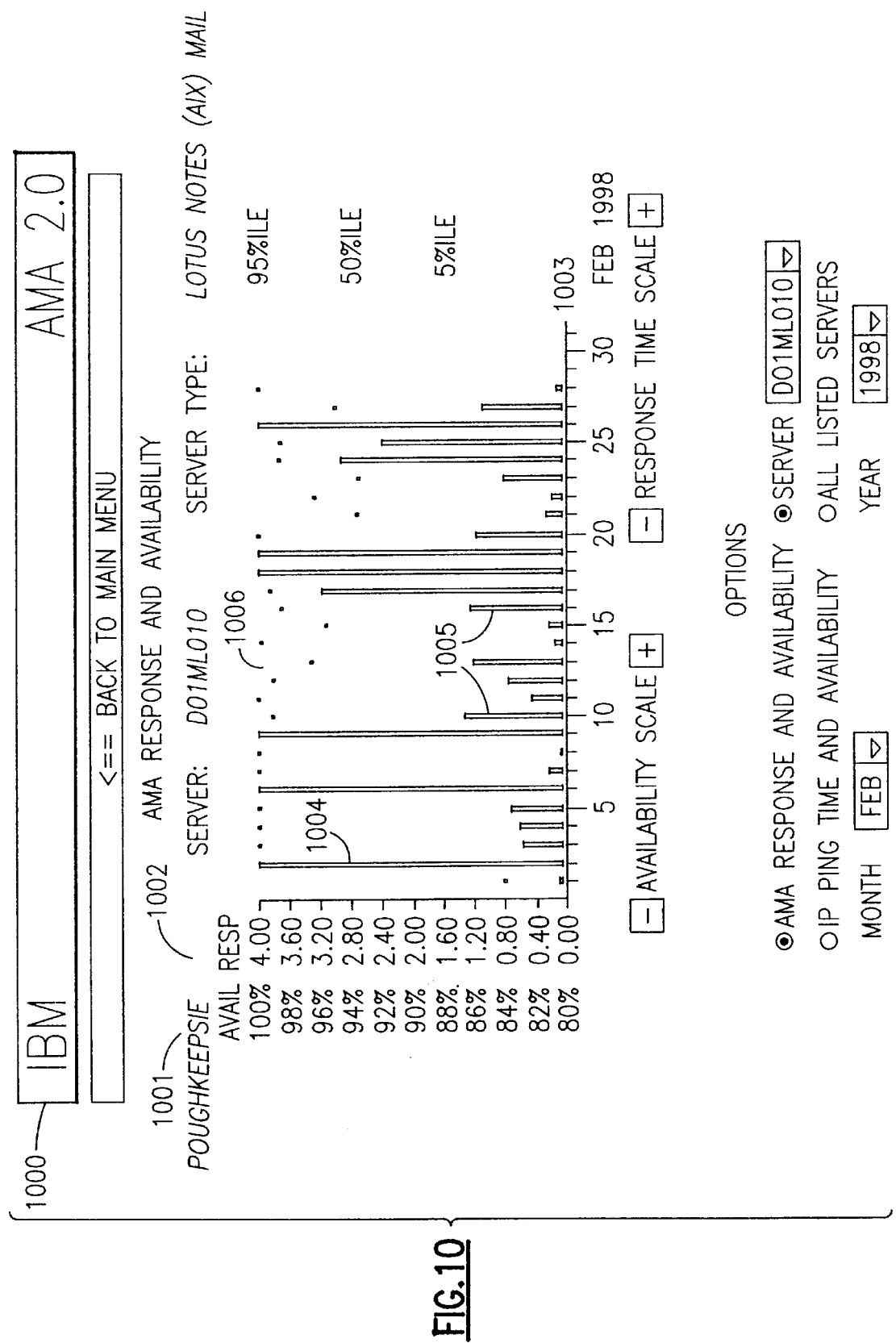
FIG. 10 and 10a present two versions of scaled graphical displays on the viewer's computer for availability and response time data for February 1998 actuated by a viewer by implementing the dynamic link in FIG. 9 for server D10ML010 running the Lotus Notes application program.

Via reference to table 900, we can see that server D01ML010exhibited a 5.649 second response time for its 95% response on Feb. $2^{nd}$. By clicking on the button 901 corresponding to this server we are presented with graph 1000 as shown in FIG. 10.

Graph 1000 illustrates, in a similar fashion to that described for graph 700, the performance (i.e., availability and response time) of server D01ML010. Server response time 1002 and availability 1001 is charted for each day 1003 of the month of February 1998.

Figure 10A:
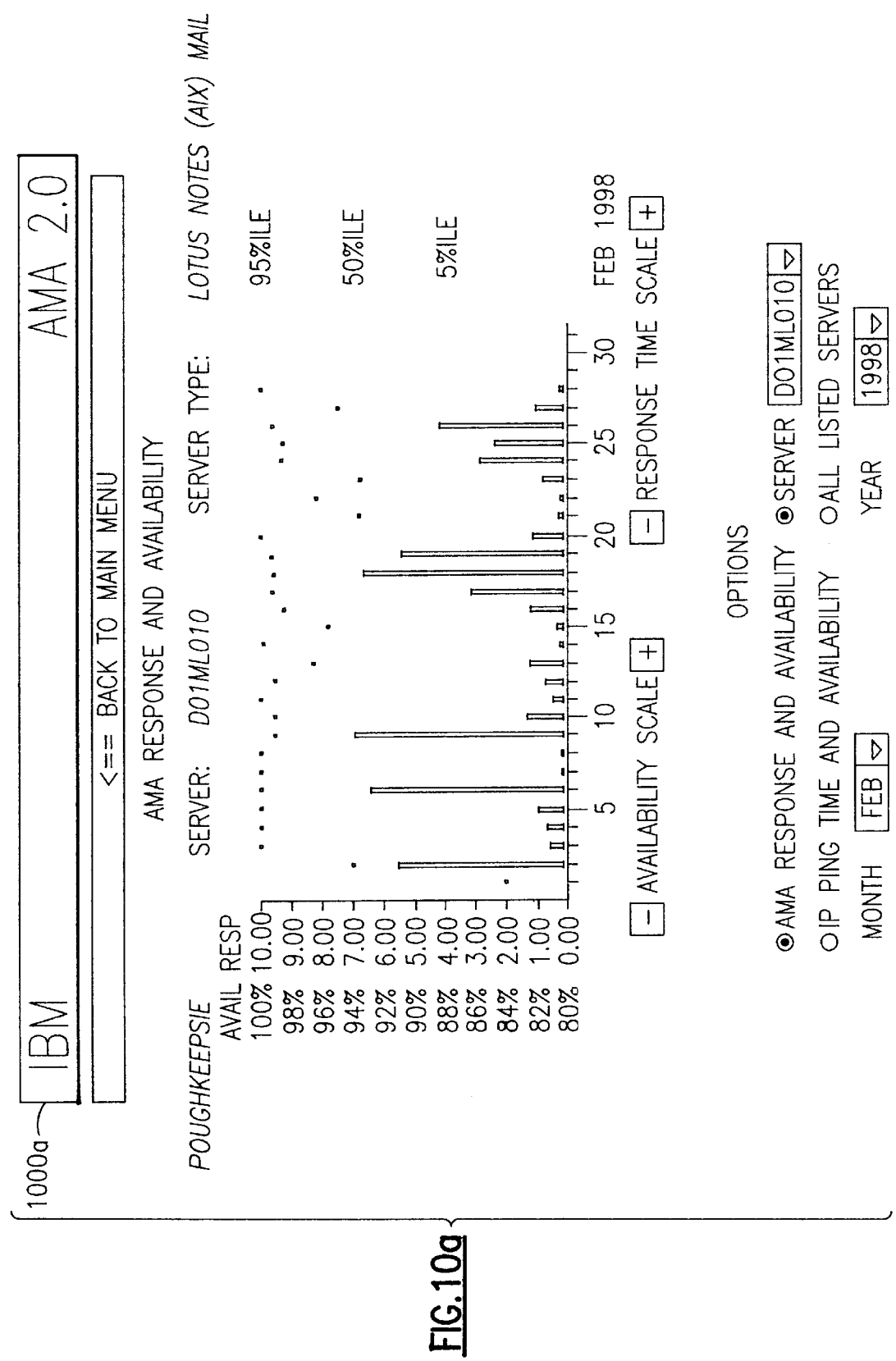

In a similar fashion as in graph 700, the bars 1004 represent the response times of the monitored application per day however, in this presentation, the data is depicted only for server D01ML010. As in graph 700, the colored hash-mark 1005 corresponding to the mid-point of the 5%–95% recorded responses for the day. The data points 1006 correspond to the availability readings for the application program per day. Since we know that server D01ML010 had a 95% response time of 5.649 seconds, the reading exceeds the upper bounds of graph 1000, however in graph 1000a in FIG. 10a the response time boundary has been expanded to show the 5.649 response time for this server on Feb. 2, 1998.

If a viewer wished to examine this data in tabular form, a mouse-click (or other such viewer-based interaction) on the background area would reveal a tabular representation of this data identical to table 800, however, the table would only represent the data in table 1000 which corresponds to server D01ML010. Since this table is virtually identical to table 800 it is not necessary to illustrate this representation, however it is significant to note that each graphical representation is dynamically linked to a table which more specifically illustrates the data underlying the graphical representation.

Figure 11:
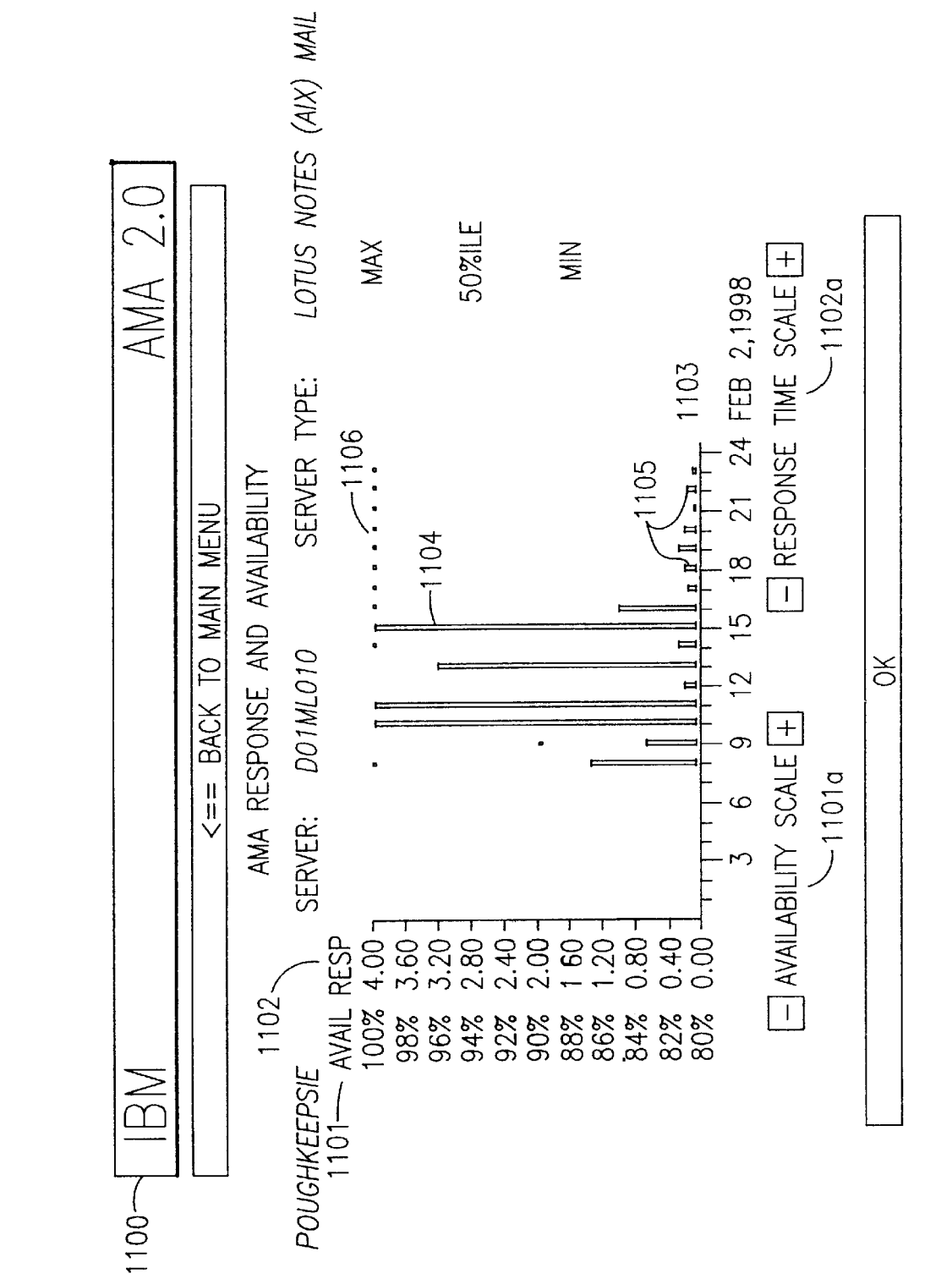
FIG. 11 and 11a present two versions of scaled graphical displays on a viewer's computer for availability and response time data for Feb. 2, 1998 actuated by the viewer by implementing the dynamic link in FIG. 10 and 10a for server D01ML010 running the Lotus Notes application program.

Referring again to FIG. 10, if a viewer wished to examine a graph of the hourly performance of server D01ML010 for Feb. 2, 1998, s/he would place a pointer on the bar 1004 corresponding to that date and by mouse-clicking would prompt the dynamic generation of graph 1100 shown in FIG. 11.

Graph 1100 is identical in format to graph 700 and graph 1000, however graph 1100 depicts availability 1101 and response time 1102 for server D01ML010 on an hourly basis 1103 on the date Feb. 2, 1998. The same indicia 1104, 1105 and 1106 are used for the response times and availability indicators, but on this graph 1100 the bars now show maximum, mid-point and the minimum values.

Figure 11A:
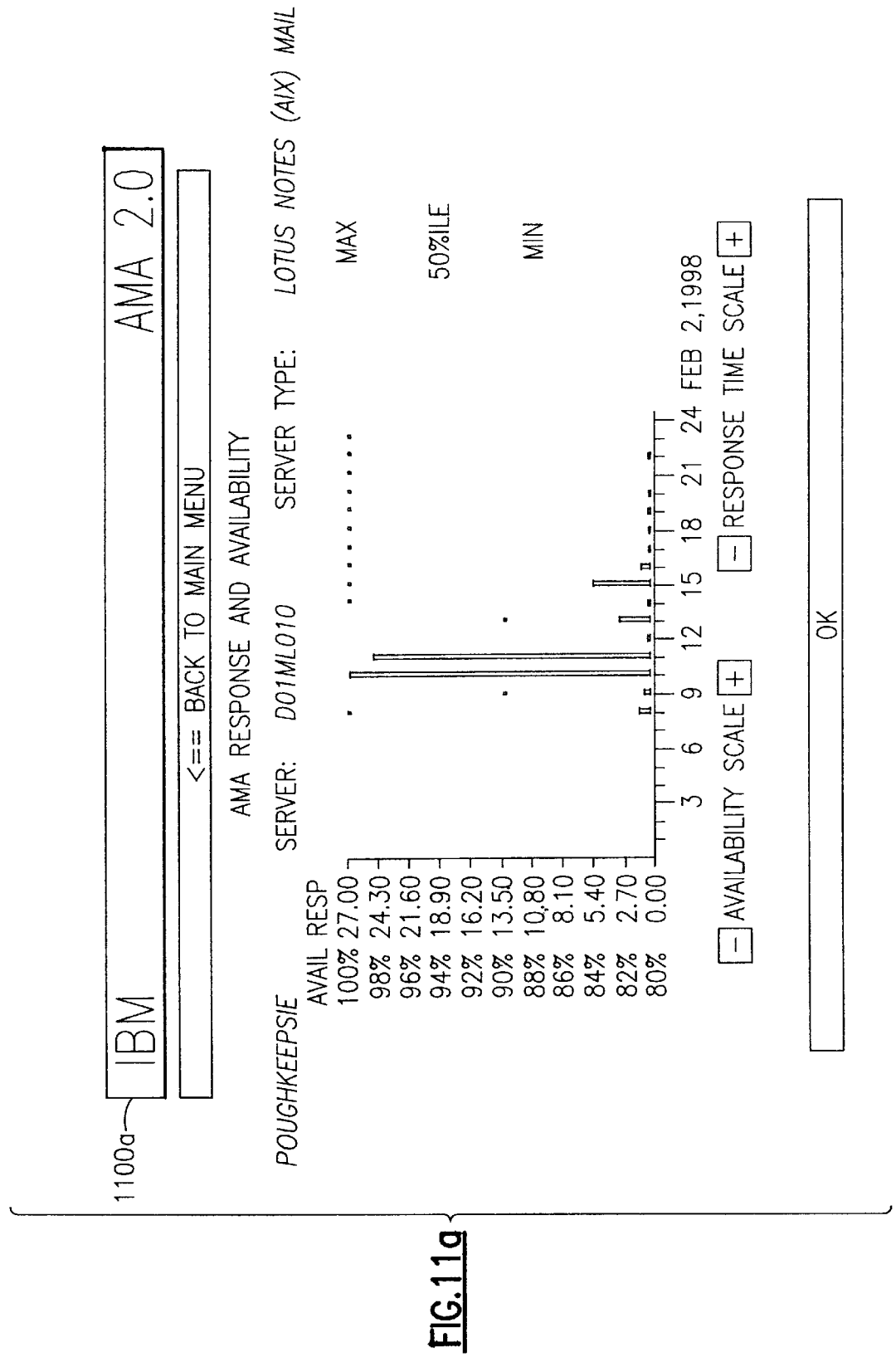

From this graphical illustration 1100 the viewer can determine at which time(s) of day the server exhibited poor response-time performance. Accordingly, by examining graph 1100 for Feb $2^{nd}$ for server D01ML010 we can see that during the hours of 10 A.M., 11 A.M. and 3 P.M. the response times appeared to be exceptionally slow. However, since graph 1100 is bounded for response times at 4.0 seconds the viewer would push the "+" button associated with the response time scale 1102a and would be presented with graph 1100a in FIG. 11a wherein it can be seen that the response time for the hour of 10 A.M. was over 27 seconds, the response time for the hour of 11 A.M. was around 25 seconds and for the hour of 3 P.M. the response time was approximately 6 seconds.

Figure 12:
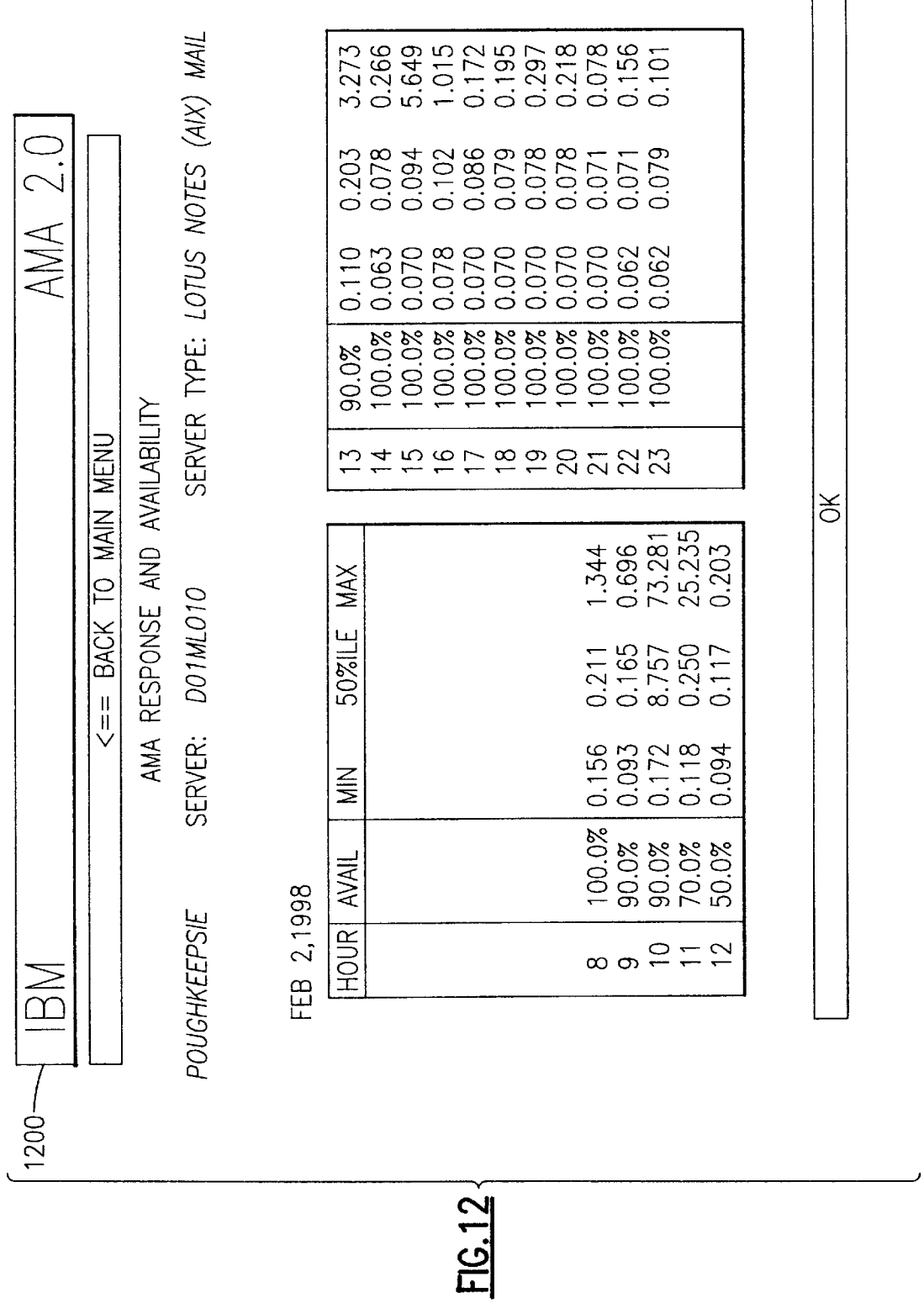
FIG. 12 depicts the data illustrated in FIGS. 11 and 11a in a tabular form which is dynamically linked thereto.

If the viewer wished to see the details for this graph 1100 he/she would click anywhere on the graph and be presented with table 1200 as shown in FIG. 12 which in turn illustrates a tabular presentation of the performance data comprising graph 1100. From this table it can be seen that the response time for D01ML010 running the monitored Lotus Notes (AIX-based) mail application was actually a worst-case 73.281 seconds during the 10 o'clock A.M. hour.

Figure 13:
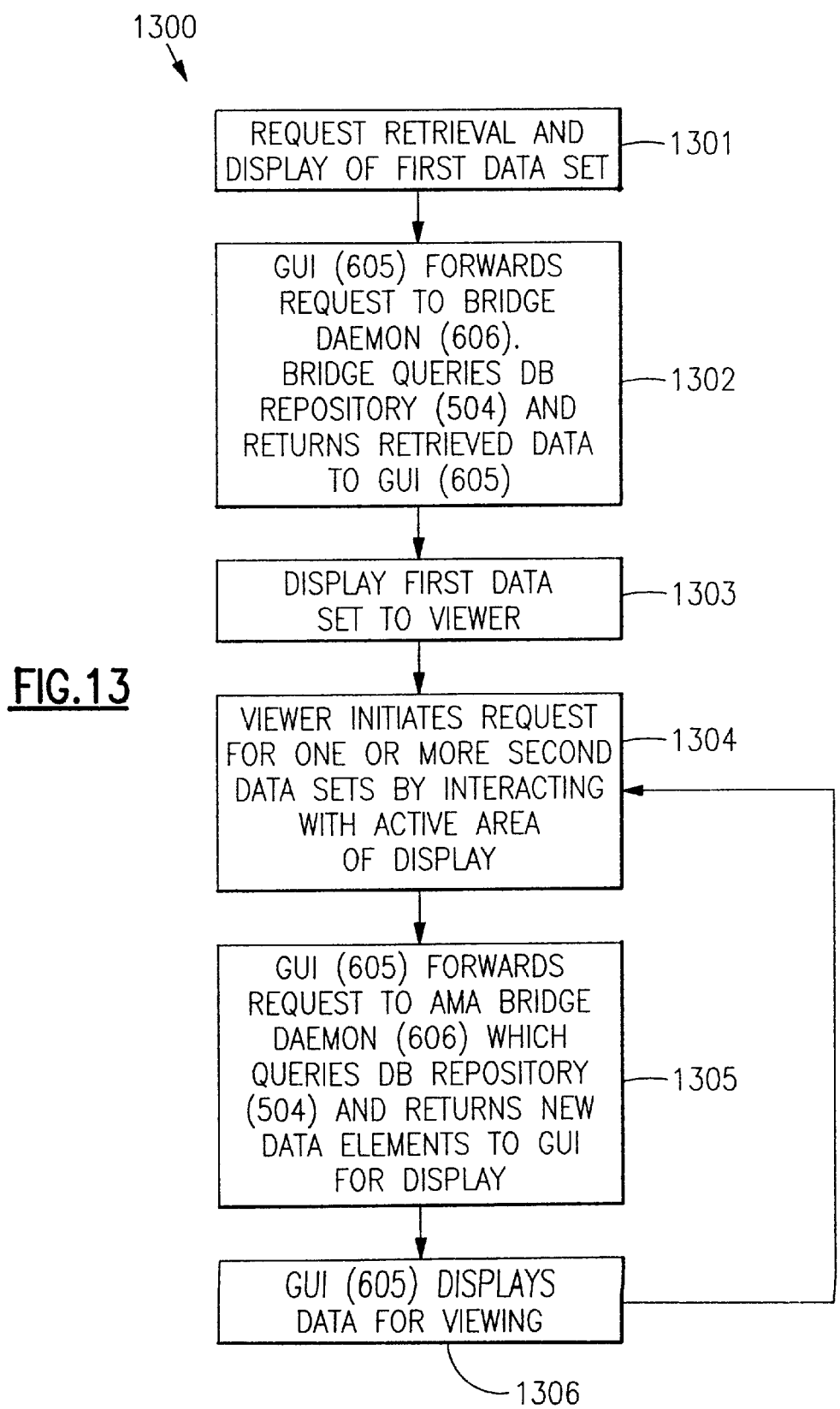
FIG. 13 presents a flow diagram illustrating the steps undertaken in response to a viewer-implemented indication to actuate the dynamic links presented in the foregoing displays in FIGS. 7–12.

FIG. 13 represents an overview of the display and report generation facilities provided by the present invention. In general, the invention provides a mechanism for interacting with tabular or graphic display representations of data from repository 504. In step 1301 the user requests the retrieval and display of a first set of data (i.e., the availability and response time data for Lotus Notes (AIX) mail application for the month of February for all servers serving the Poughkeepsie, N.Y. office location (see FIG. 7)). In step 1302 the GUI 605 forwards the request to the bridge daemon 606 which in turn queries the repository 504 and then returns the retrieved data to the GUI which then displays the requested data in step 1303. The user interacts with designated hot points on the display in step 1304 which in turn initiates a request for a second set of data related to the data shown and interacted with on the first display. Next in step 1305 the GUI 605 again passes the request to the AMA bridge daemon 606 which queries the repository 504 for the requested related data, the data is provided via the bridge to the GUI 605 1305 which then builds the display of the second set of related data based upon the data returned from the repository in step 1306.

Figure 14:
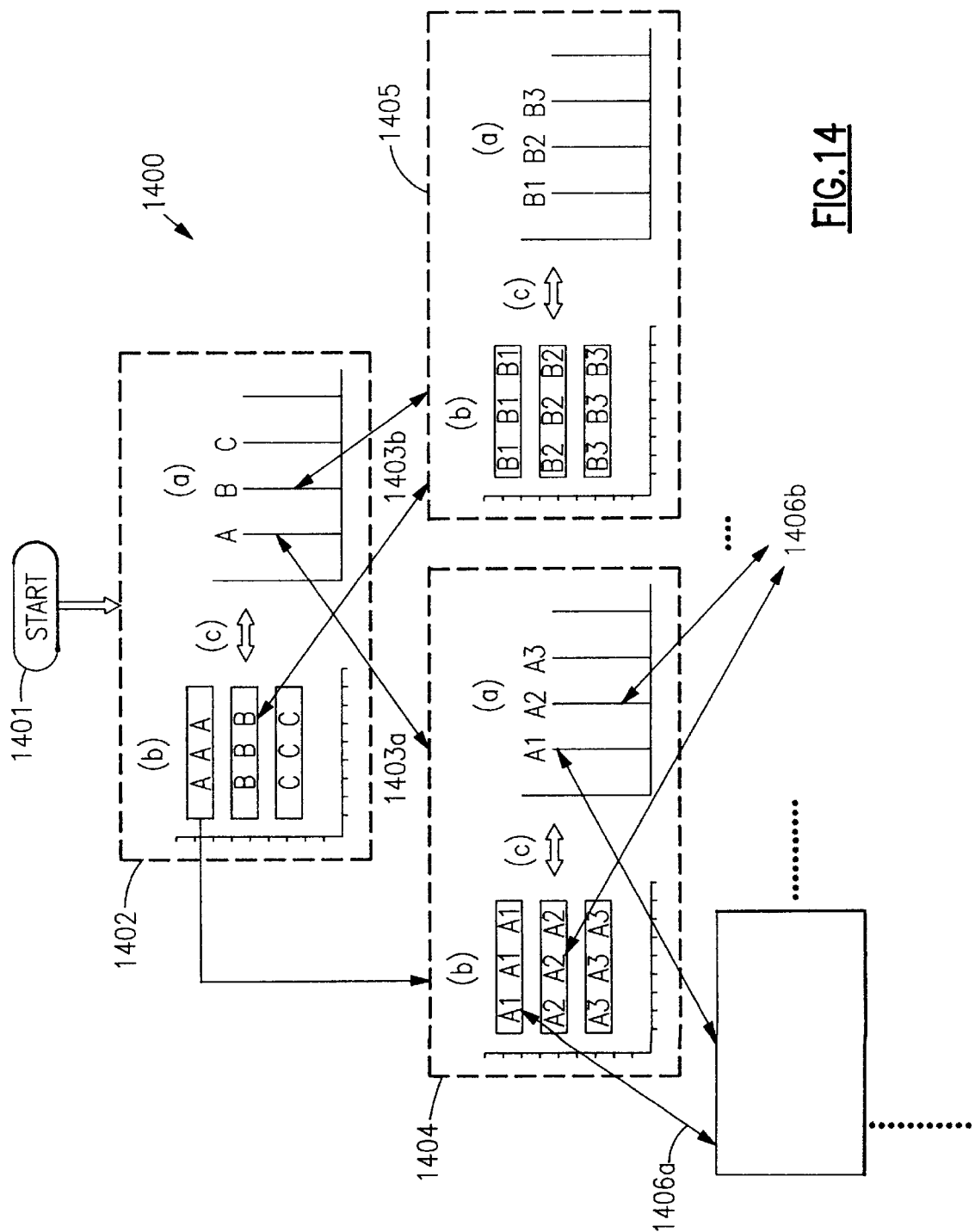
FIG. 14 displays an inverted tree graph illustrating the inter-relationships of the dynamically linked displays typified by those illustrated in FIGS. 7–12.

In FIG. 14 which can be read in conjunction with FIG. 13 it can be seen that the interrelation of the successive displays described above can be viewed as an inverted tree graph 1400. Starting at block 1401 a viewer requests via a menu (or otherwise) on his computer system the display of a data set including application program monitoring data as indicated in block 1402. It will be noted that block 1402 includes both a graphical representation of the monitoring data set illustratively represented by bar graph 1402a and a tabular representation of the monitoring data set shown as table 1402b. The table and graph are dynamically linked to one another by link 1402c such that a viewer may jump between a tabular display of the data set and a graphical display of the data set by clicking on (or otherwise interfacing with) an active display area on the viewer's computer system.

Within the data set depicted in table 1402b or graph 1402a are data elements represented as A and B. Each of these data elements in both the table and graph may be implemented as the aforementioned active areas or hot-spot such that they may be indicated via a mouse click or other viewer interface technique. In response to the viewer's indication, the dynamic linking activities as depicted in FIG. 13 are implemented to provide the display of a second data set including associated data elements. For example, if the were to indicate data element A within table 1402b or graph 1402a the sequence illustrated in FIG. 13 would be initiated for dynamic link 1403a to subsequently display the table and/or graphic display represented by block 1404.

In block 1404 a graphic representation 1404a and a tabular representation 1404b are shown for the displayed second data set. The second data set includes data elements $A_1$, $A_2$ and $A_3$ which are associated to the data element A in the data set shown in graph 1402a or table 1042b. Each of these associated elements in a preferred embodiment represents a component of the data element A. For example, in an embodiment wherein the data element A represents the range of response times recorded for a given day for a Lotus Notes application program response to three different probes (i.e., probe 1, probe 2 and probe 3), the data set shown in 1404a and 1404b includes the range of response time recorded at each probe for that given day, such that $A_1$ represents response data for probe 1 on the given day, $A_2$ represents the responses received at probe 2, and $A_3$ represents the responses at probe 3 for the given day. It will of course be understood that graph 1404a and table 1404b are dynamically linked to each other via 1404c and can be toggled in a manner similar to that described for the data sets 1402a and 1402b via link 1402c.

It will further be understood that each data element shown in data set 1402 (i.e., A and B) may be linked 1403a and 1403b to further representations as has been described for data element A.

Each of the data elements in the data set shown in 1404a and 1404b may be further dynamically linked via links 1406 to further data sets (not shown) which in turn include data elements which represent components of the data elements in the data set 1404*a* and 1404*b* (i.e., the data elements A$_1$, A$_2$ and A$_3$).

It will be appreciated from the foregoing exemplary embodiment, that the AMA GUI in combination with the bridge 606 and repository 504 enable an end-user to quickly and efficiently analyze voluminous data records. In the foregoing simplified example a viewer was permitted to "drill-down" from an overview of server performance to localized a response time aberration to a specific server at a specific time of day.

It will be further appreciated that the foregoing techniques may be coupled with available data corresponding to server specific performance, such as data provided by IBM Netfinity or other such products to further refine the problem determination process. The granularity of this determination process is limited only by the amount and types of network performance measurements gathered for a given network and by the limitations of data mining and analysis tools for correlating this collected information.

A further inventive feature of the present invention entails the techniques utilized for providing alerts to service personnel upon the determination that any of the defined performance criteria have been violated.

As previously described, the AMA probe 201 may be provided with probe configuration information 202, including threshold information such as maximum response time or minimum application availability. These criteria are monitored by the AMA probe code 303 and when a violation is detected an alert signal 308 is generated by the probe for informing an alerting mechanism 205 of the violation. The alerting mechanism 205 may in turn function by signaling the violation to a support person, or otherwise actuating a problem remediation response.

Figure 15:
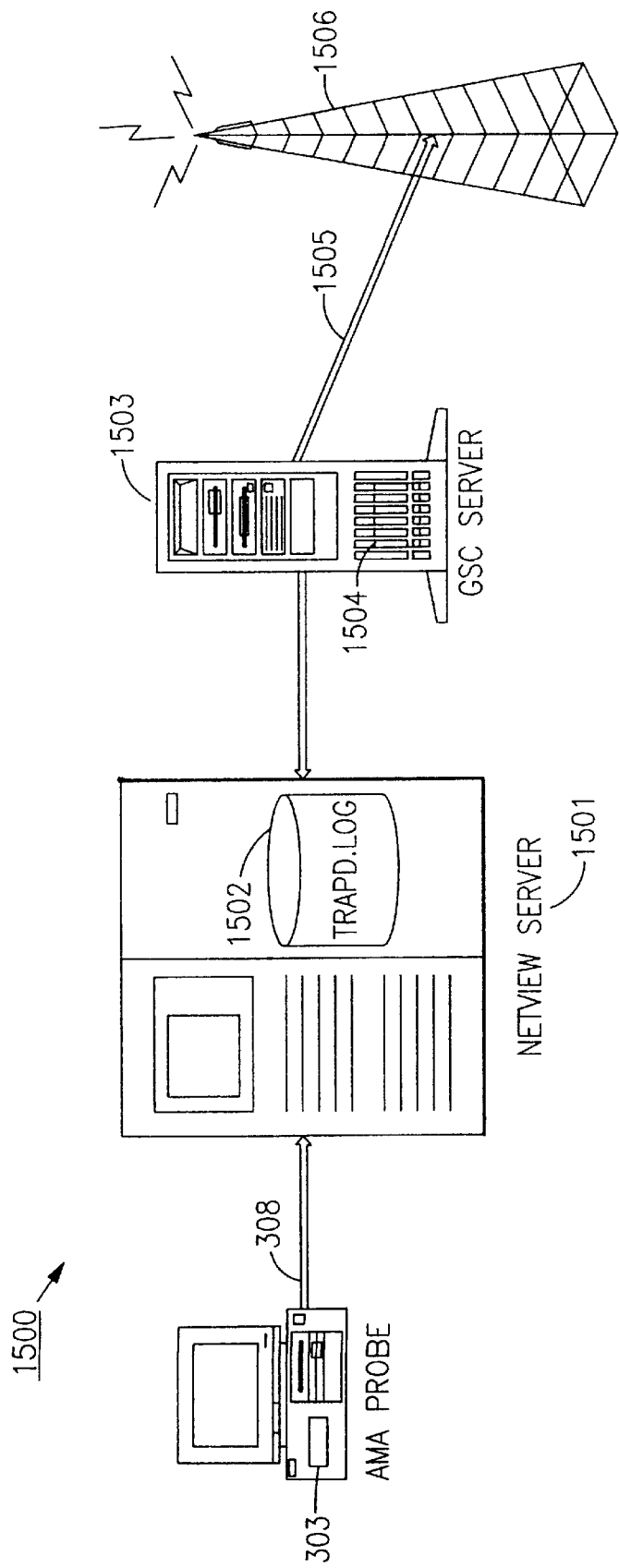
FIG. 15 more particularly illustrates features of the alerting function of the present invention.

FIG. 15 illustrates an exemplary implementation of this alerting sequence 1500 in more detail. When a threshold defined as part of the probe configuration information 302 has been violated as determined by the AMA probe code 303, an alert signal 308 is sent to the alerting mechanism 205 which is illustrated in the preferred embodiment as a server computer 1501 running the IBM NetView (R) software application program (hereinafter the NetView server). In the preferred embodiment the threshold violation causes the AMA probe code to generate a software indication known as a trap 308. This trap indication is defined in accordance with the transmission control protocol/internet protocol (TCP/IP), simple network messaging protocol (SNMP) configuration for client-server network based communication. This trap indication includes information about the server computer 202 and application program 203 therein which is in violation, and the type of violation that has been recorded. The aforementioned software trap is well-known to those having skill in the art and as such needs no detailed explanation. It will be further understood that while the present invention implements a software trap to signal the occurrence of a violation, other mechanisms such as e-mail, or paging, pop-up screens or other notification methodologies may be utilized as well.

Once the trap 308 is received at the NetView server 1501 it is appended to a repository trapd.log 1502 within the server. The repository 1502 is in turn scanned at pre-defined intervals by another server 1503 (illustrated as the IBM Global Services Coordinator (GSC) server).

The GSC server 1503 compares any new entries in the trapd.log 1502 with a set of tables 1504 within the GSC server. These tables 1504 include information related to the application type, server location violation type and the service person who is to be informed of the violation, how to inform that person (i.e., e-mail, paging, etc.) which may be based upon such factors as the criticality of the violation and the time of day.

If the GSC server is able to match the server, application and violation type from trapd.log 1502 with an entry in its tables 1504, an alert signal 1505 is generated in accordance with the specified modality 1506 (i.e., pager, e-mail etc.) to the indicated party.

If the AMA probe code 303 subsequently determines that a violated threshold has return to an acceptable level, further facilities may be provided for canceling the alert. In such an embodiment, the cancellation would follow the same sequence as the original violation indication wherein a new software trap 308 would be generated, this time indicating that the violation has been resolved. The trap would be stored in trapd.log 1502 and scanned by the GSC server 1503 whose tables 1504 would indicate that the alert should be canceled which in turn would either stop the alert signal 1505 prior to transmission 1506 or alternatively transmit 1506 a message 1505 canceling the prior alert.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention defined in the following claims, which should be construed so as to maintain the proper protection for the invention first disclosed.

Having now described our invention in detail, what we consider as new and desire to protect via Letters Patent is as follows:

1. In a computer network having a front-end server system for providing an interface package for enabling a requester computer system to access a remote and a bridge element for facilitating the transfer of information between said remote resource and said requester computer system, a method for providing access to said remote resource for said requester computer system, the method comprising the steps of:

provinding said interface package to said requester system in a first communication session from said front-end server system to said requester computer system to enable access to said remote resource by said requester computer system;

establishing a second communication session between said requester computer system and said bridge element using said interface package said second communication session being independent of said front-end server;

receiving at said bridge element requests generated from said requestor computer system for said remote resource, said bridge element forwarding said requests via a third communication session to said remote resource; and sending a response to said request from said remote resource through said bridge element to said requestor computer system.

2. A method according to claim 1 wherein said interface package includes an interface program which is executed at said requestor computer system.

3. A method according to claim 2 further including the steps of:

processing, via said interface program at said requestor computer system, said requests for said access to said remote resource by said requester computer system;

receiving said response to said requests at said requestor computer system via said second communication session; and processing at said requestor computer system said received response to said request sent from said remote resource said response to said request being processed by said interface program to display said response to said request at said requester computer system.

4. A method according to claim 3 wherein said interface program includes a graphical user interface for generation of said requests for said access to said remote resource by said requestor computer system, and for displaying said received response to said request at said requestor computer system.

5. A method according to claim 1 wherein said first communication session between said front-end server system and said requester computer system is terminated upon said providing of said interface package from said front-end server system to said requester computer system.

6. A method according to claim 1 wherein said requester computer system is authenticated to receive said interface package from said front-end server system via said first communication session between front-end server system and said requestor computer system.

7. A method according to claim 1 wherein said requester computer system is authenticated for access to said remote resource through said first communication session between said front-end server system and said requester computer system.

8. A method according to claim 1 wherein said requests for said access to said remote resource may be generated by one or more of said requester computer systems and wherein said second communication session is established between each of said one or more requester computer systems and said bridge element for sending said response to said request therebetween.

9. A method according to claim 8 wherein said third communication session between said bridge element and said remote resource remains open to serially send said response to said request from said remote resource through said bridge element to said one or more requester computer system over said second communication session.

10. A method according to claim 1 wherein data stored in said remote resource corresponds to the performance of a monitored application program in a computer network.

11. A method according to claim 1 wherein said bridge element comprises a program running in said remote resource.

12. A method according to claim 1 wherein said remote resource includes a data repository.

13. A method according to claim 1 wherein said bridge element forwarding step comprises modifying said forwarded request.

14. In a computer network having a front-end server system for providing an interface package for enabling a requester computer system to access a remote resource and a bridge element for facilitating the transfer of information between said remote resource and said requestor computer system, an apparatus for providing access to said remote resource for said requestor computer system, the apparatus comprising:

means for providing said interface package to said requester system in a first communication session from said front-end server system to said requester computer system to enable access to said remote resource by said requestor computer system;

means for establishing a second communication session between said requestor computer system and said bridge element using said interface package, said second communication session being independent of said front-end server;

means for receiving at said bridge element requests generated from said requestor computer system for said remote resource, said bridge element forwarding said requests via a third communication session to said remote resource; and means for sending a response to said request from said remote resource through said bridge element to said requestor computer system.

15. An apparatus according to claim 14 wherein said interface package includes an interface program which is executed at said requestor computer system.

16. An apparatus according to claim 15 further including:

means for processing, via said interface program at said requestor computer system, said requests for said access to said remote resource by said requester computer system;

means for receiving said response to said requests at said requestor computer system via said second communication session, and means for processing at said requestor computer system said received response to said request sent from said remote resource, said response to said request being processed by said interface program to display said response to said request at said requester computer system.

17. An apparatus according to claim 16 wherein said interface program includes a graphical user interface for generation of said requests for said remote resource access by said requester computer system, and for displaying said received response at said requester computer system.

18. An apparatus according to claim 14 wherein said first communication session between said front-end server system and said requester computer system is terminated upon said providing of said interface package from said front-end server system to said requester computer system.

19. An apparatus according to claim 14 wherein said requester computer system is authenticated to receive said interface package from said front-end server system via said first communication session between said front-end server system and said requester computer system.

20. An apparatus according to claim 14 wherein said requester computer system is authenticated for access to said remote resource through said first communication session between said front-end server system and said requester computer system.

21. An apparatus according to claim 14 wherein said requests for said access to said remote resource may be generated by one or more of said requester computer systems and wherein said second communication session is established between each of said one or more requestor computer systems and said bridge element for sending said response to said request therebetween.

22. An apparatus according to claim 14 wherein said third communication session between said bridge element and said remote resource remains open to serially send said response to said request from said remote resource through said bridge element to said one or more requester computer system over said second communication session.

23. An apparatus according to claim 14 wherein data stored in said remote resource corresponds to the performance of a monitored application program in a computer network.

24. An apparatus according to claim 14 wherein said bridge element comprises a program running in said remote resource.

25. An apparatus according to claim 14 wherein said remote resource includes a data repository.

26. An apparatus according to claim 14 wherein said bridge element comprises means for modifying said forwarded request during said forwarding of said requests via said third communication session.

27. In a computer network having a front-end server system for providing an interface package for enabling a requester computer system to access a remote resource and a bridge element for facilitating the transfer of information between said remote resource and said requestor computer system, a program storage device readable by a digital processing apparatus and tangibly embodying a program of instructions executable by said digital processing apparatus to perform method steps for providing access to said remote resource for said requestor computer system, the method comprising:

providing said interface package to said requester system in a first communication session from said front-end server system to said requester computer system to enable access to said remote resource by said requester computer system;

establishing a second communication session between said requester computer system and said bridge element using said interface package, said second communication session being independent of said front-end server;

receiving at said bridge element requests generated from said requester computer system for said remote resource, said bridge element forwarding said requests via a third communication session to said remote resource; and sending a response to said request from said remote resource through said bridge element to said requestor computer system.

28. A program storage device according to claim 27 wherein said interface package includes an interface program which is executed at said requester computer system.

29. A program storage device according to claim 28 further including the steps of:

processing, via said interface program at said requestor computer system, said requests for said access to said remote resource by said requestor computer system;

receiving said response to said requests at said requester computer system via said second communication session; and processing at said requester computer system said received response to said request sent from said remote resource, said response to said request being processed by said interface program to display said response to said request at said requester computer system.

30. A program storage device according to claim 29 wherein said interface program includes a graphical user interface for generation of said requests for said access to said remote resource by said requester computer system, and for displaying said received response from said remote resource at said requester computer system.

31. A program storage device according to claim 27 wherein said first communication session between said front-end server system and said requestor computer system is terminated upon said providing of said interface package from said front-end server system to said requester computer system.

32. A program storage device to claim 27 wherein said requester computer system is authenticated to receive said interface package from said front-end server system via said first communication session between said front-end server system and said requester computer system.

33. A program storage device to claim 27 wherein said requester computer system is authenticated for access to said remote resource through said first communication session between said front-end server system and said requester computer system.

34. A program storage device according to claim 27 wherein said requests for said access to said remote resource may be generated by one or more of said requester computer systems and wherein said second communication session is established between each of said one or more requester computer systems and said bridge element for sending said response to said request therebetween.

35. A program storage device according to claim 27 wherein said third communication session between said bridge element and said remote resource remains open to serially send said response to said request from said remote resource through said bridge element to said one or more requester computer system over said second communication session.

36. A program storage device according to claim 27 wherein data stored in said remote resource corresponds to the performance of a monitored application program in a computer network.

37. A program storage device according to claim 27 wherein said bridge element comprises a program running in said remote resource.

38. A program storage device according to claim 27 wherein said remote resource includes a data repository.

39. A program storage device according to claim 27 wherein said bridge element forwarding step comprises modifying said forwarded request.

* * * * *